US010896163B1

(12) United States Patent
Bowles et al.

(10) Patent No.: US 10,896,163 B1
(45) Date of Patent: Jan. 19, 2021

(54) METHOD AND APPARATUS FOR QUERY FORMULATION

(71) Applicants: Mark Edward Bowles, San Mateo, CA (US); Jens Erik Tellefsen, Mountain View, CA (US); Ranjeet Singh Bhatia, Sunnyvale, CA (US)

(72) Inventors: Mark Edward Bowles, San Mateo, CA (US); Jens Erik Tellefsen, Mountain View, CA (US); Ranjeet Singh Bhatia, Sunnyvale, CA (US)

(73) Assignee: NetBase Solutions, Inc., Santa Clara, CA (US)

( * ) Notice: Subject to any disclaimer, the term of this patent is extended or adjusted under 35 U.S.C. 154(b) by 0 days.

(21) Appl. No.: 14/793,644

(22) Filed: Jul. 7, 2015

Related U.S. Application Data

(63) Continuation of application No. 13/280,294, filed on Oct. 24, 2011, now Pat. No. 9,075,799.

(51) Int. Cl.
G06F 17/30 (2006.01)
G06F 16/22 (2019.01)
G06F 16/28 (2019.01)

(52) U.S. Cl.
CPC ........ G06F 16/2237 (2019.01); G06F 16/285 (2019.01)

(58) Field of Classification Search
CPC ............................ G06F 16/285; G06F 16/2237
(Continued)

(56) References Cited

U.S. PATENT DOCUMENTS 5,694,523 A    12/1997  Wical
5,850,561 A *  12/1998  Church ............... G06F 17/2795
                                                         715/234
(Continued)

OTHER PUBLICATIONS

Gautam et al., published Feb. 17, 2008 (y/m/d), pp. 2040-2042. "Document Retrieval Based on Key Information of Sentence," IEEE ICACT.

(Continued)

Primary Examiner — Isaac M Woo
(74) Attorney, Agent, or Firm — Kaplan IP Law, PLLC; Jonathan T. Kaplan

(57) ABSTRACT

To the standard operations of an inverted index database, a new "To" operator is added. The "To" operator treats the standard single-level linear collection of records as being organized into localized clusters. Techniques for hierarchical clusters are presented. During indexing, hierarchical clusters are serialized according to a uniform visitation procedure. Serialization produces bit maps, one for each hierarchical level, that preserve the hierarchical level of each record and its location in the serialization sequence. The "To" operator accepts a list of records, each at a same hierarchical level in a cluster, and a specification of a hierarchical level that all the input records should be converted into. The "To" operator outputs a list of records, representing a conversion of the input records to the specified new level.

When searching a Corpus-of-Interest for an Object-of-Interest, techniques are presented for greatly improving the process by which Exclude Terms are identified. Exclude Terms are particularly useful when the lexical units, representing an Object-of-Interest, are ambiguous. When in the mode of searching for Exclude Terms, the Object-of-Interest of interest is sought, in the Corpus-of-Interest, in a broader context than when the Exclude Terms are utilized as part of an actual query. The Object-of-Interest can match anywhere (Continued)

in a snippet, rather than just in the focus sentence. Using the "To" operator, the focus sentences thus found are converted into role values. Statistical sampling of the role values may be used to reduce the data for the next step of processing. The role values are subjected to frequency and cluster analysis, at the lexical unit level, in order to identify candidate Exclude Terms that a user can select. Frequency and clustering information, is presented to the user, to aid in the decision process. The search for Exclude Terms can be repeated, using the Exclude Terms located thus far.

14 Claims, 13 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 5,940,821 A | 8/1999 | Wical | |
| 5,963,940 A | 10/1999 | Liddy et al. | |
| 5,995,922 A | 11/1999 | Penteroudakis et al. | |
| 6,202,064 B1 | 3/2001 | Julliard | |
| 6,269,356 B1 | 7/2001 | Hatton | |
| 6,278,967 B1 | 8/2001 | Akers et al. | |
| 6,453,312 B1 | 9/2002 | Goiffon et al. | |
| 6,560,590 B1 | 5/2003 | Shwe et al. | |
| 6,571,240 B1 | 5/2003 | Ho | |
| 6,578,022 B1 | 6/2003 | Foulger et al. | |
| 6,584,464 B1 | 6/2003 | Warthen | |
| 6,671,723 B2 | 12/2003 | Nguyen et al. | |
| 6,675,159 B1 | 1/2004 | Lin et al. | |
| 6,738,765 B1 | 5/2004 | Wakefield et al. | |
| 7,302,383 B2 | 11/2007 | Valles | |
| 7,356,540 B2* | 4/2008 | Smith | G06F 17/30607 |
| 7,496,593 B2 | 2/2009 | Gardner et al. | |
| 7,779,007 B2 | 8/2010 | West et al. | |
| 7,805,302 B2 | 9/2010 | Chelba et al. | |
| 8,046,348 B1 | 10/2011 | Rehling et al. | |
| 8,055,608 B1 | 11/2011 | Rehling et al. | |
| 8,131,540 B2 | 3/2012 | Marchisio et al. | |
| 8,935,152 B1 | 1/2015 | Li et al. | |
| 9,047,285 B1 | 6/2015 | Li et al. | |
| 2002/0091671 A1 | 7/2002 | Prokoph | |
| 2003/0172061 A1 | 9/2003 | Krupin et al. | |
| 2003/0216905 A1 | 11/2003 | Chelba et al. | |
| 2004/0044952 A1 | 3/2004 | Jiang et al. | |
| 2004/0078190 A1 | 4/2004 | Fass et al. | |
| 2004/0186827 A1 | 9/2004 | Anick et al. | |
| 2005/0149494 A1 | 7/2005 | Lindh et al. | |
| 2005/0165600 A1 | 7/2005 | Kasravi et al. | |
| 2007/0156677 A1 | 7/2007 | Szabo | |
| 2009/0112892 A1 | 4/2009 | Cardie | |
| 2009/0319517 A1* | 12/2009 | Guha | G06F 17/30864 |
| 2015/0293997 A1 | 10/2015 | Smith et al. | |

OTHER PUBLICATIONS

Ku et al., published Mar. 27, 2006 (y-m-d), 8 pgs. "Opinion Extraction, Summarization and Tracking in News and Blog Corpora," AAAI Spring Symposium Series 2006.

Manning et al., published 1999. "Foundations of Statistical Natural Language Processing," The MIT Press, Table of Contents (12 pgs), sec. 8.5.1 (pp. 296-303) & sec. 15.2 (pp. 539-544). ISBN 0-262-13360-1.

Ruppenhofer et al., published Aug. 25, 2006 (y/m/d), 166 pages. "FrameNet II: Extended Theory and Practice," International Computer Science Institute, University of California at Berkeley, USA.

Wu, Tianhaow et al., published May, 3, 2003 (y/m/d), 12 pgs. "A Supervised Learning Algorithm for Information Extraction From Textual Data," Proceedings of the Workshop on Text Mining, Third Siam International Conference on Data Mining.

Zadrozny, Slawomir et al., published 2003, 5 pgs. "Linguistically quantified thresholding strategies for text categorization," Systems Research Institute, Polish Academy of Sciences, Warszawa, Poland.

Zhang et al., published Jun. 22, 2010 (y/m/d), 10 pgs. "Voice of the Customers: Mining Online Customer Reviews for Product Feature-based Ranking," Proceedings of the 3rd Wonference on Online social networks (WOSN '10). USENIX Association, Berkeley, CA, USA.

Lucene Support p. 2454, with comments dated May 10, 2010-Jul. 16, 2010; https://issues.apache.org/jira/browse/LUCENE-2454; retrieved Jul. 24, 2019 (y/m/d); 9 pages.

Lucene Slide Share Presentation, dated May 7, 2010; https://www.slideshare.net/MarkHarwood/proposal-for-nested-document-support-in-lucene; retrieved Jul. 24, 2019 (y/m/d); 15 pages.

readme.txt in LuceneNestedDocumentSupport.zip, creation date May 10, 2010; retrieved Jul. 25, 2019 (y/m/d); 2 pages.

NestedDocumentQuery.java in LuceneNestedDocumentSupport.zip, creation date Aug. 25, 2010; retrieved Jul. 25, 2019 (y/m/d); 8 pages.

PerParentLimitedQuery.java in LuceneNestedDocumentSupport.zip, creation date Sep. 8, 2010; retrieved Jul. 25, 2019 (y/m/d); 10 pages.

* cited by examiner

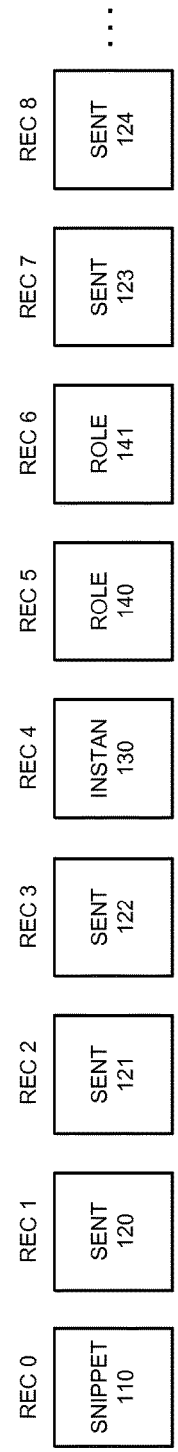
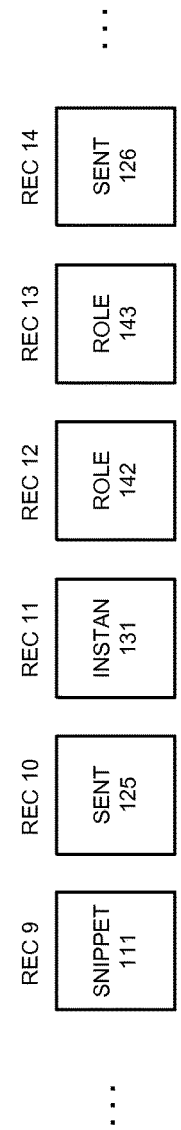

FIGURE 3

| RECORD ID | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| SNIPPET: 0 | 1 | 0 | 0 | 0 | 0 | 0 | 0 | 0 | 0 | 1 | 0 | 0 | 0 | 0 | 0 |
| SENTENCE: 1 | 0 | 1 | 1 | 1 | 0 | 0 | 0 | 1 | 1 | 0 | 1 | 0 | 0 | 0 | 1 |
| INSTANCE: 2 | 0 | 0 | 0 | 0 | 1 | 0 | 0 | 0 | 0 | 0 | 0 | 1 | 0 | 0 | 0 |
| ROLE: 3 | 0 | 0 | 0 | 0 | 0 | 1 | 1 | 0 | 0 | 0 | 0 | 0 | 1 | 1 | 0 |

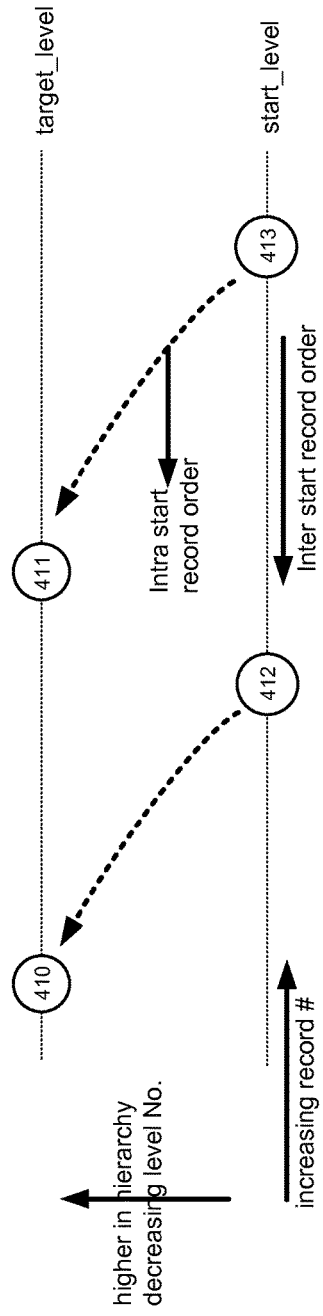
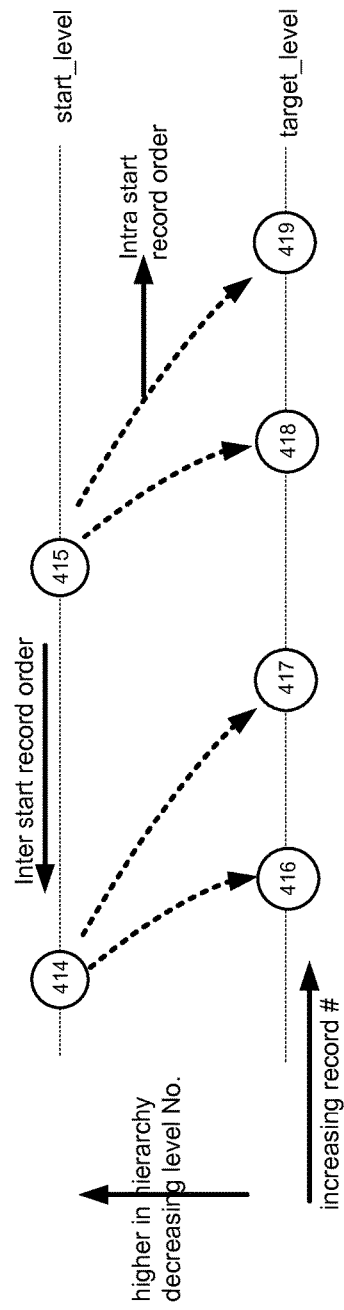

Figure 5
Definition of "To" Operator

```
1   To ( rel_target_level , recs_2b_mapped ) {
2     addi_mapped_recs = null;
3     mapped_recs = null;
4     for each record "rec_current" of recs_2b_mapped, proceeding in a reverse direction to serialization {
5       if rel_target_level < 0 {
6         if rec_current is contained in addi_mapped_recs {
7           add rec_current to mapped_recs, in a direction reverse to serialization;
8           go directly to next iteration of "for each record";
9         }
10        target_record = Single_To ( rel_target_level , rec_current, addi_mapped_recs );
11        add target_record to mapped_recs, in a direction reverse to serialization;
12      }
13      if rel_target_level > 0 {
14        target_records = Single_To ( rel_target_level , rec_current, addi_mapped_recs );
15        add target_records to mapped_recs, in a direction reverse to serialization;
16      }
17    } /* end "for" loop */
18    return mapped_recs;
19  } /* end "To" procedure definition */
20
```

Figure 6A
Definition of "Single_To" Operator

```
1   Single_To ( rel_target_level , start_rec, addi_results ) {
2   start_level = level (start_rec );
3   target_level = start_level + rel_target_level;
4   current_rec = start_rec;
5   addi_results = null;
6   if target_level < start_level { /* going up the hierarchy, looking for the containing record at the target_level */
7       while ( level ( current_rec ) ≠ target_level ) {
8           left_rec = record immediately next to current_rec, in a direction reverse to serialization;
9           if ( level(left_rec) = level(current_rec) )
10              mark left_rec and current_rec as being siblings;
11          if ( level(left_rec) < level(current_rec) ) {
12              make current_rec, and any other records of same level as current_rec already marked as a sibling, a
                child of left_rec;
13              unmark any records, marked as being a sibling, that were made a child of left_rec;
14          }
15          if ( level(left_rec) > level(current_rec) ) {
16              start a subtree for record left_rec;
17              mark record current_rec as being a sibling of any other records that may be at the same level;
18          }
19          current_rec = left_rec;
20      } /* end "while" */
21      addi_results = any records at same level as start_level, other than start_rec, identified in the reconstructed tree;
22      return root, of the reconstructed tree, as the record of target_level that contains start_rec;
23  } /* end "if" */
24
```

Figure 6B
Definition of "Single_To" Operator (continued)

```
1  if target_level > start_level {  /* go down the hierarchy looking for the record(s), at the target_level, contained in start_rec */
2      right_rec = record immediately next to current_rec, in the same direction as serialization;
3      while ( level(right_rec) > start_level ) {
4          if ( level(right_rec) > level(current_rec) )
5              make right_rec a child of current_rec;
6          if ( level(right_rec) ≤ level(current_rec) ) {
7              if ( level(right_rec) = level(current_rec) )
8                  make right_rec a sibling of current_rec;
9              else
10                 /* if "else" is executed, we know that right_rec will be higher in reconstructed tree than current_rec (i.e.,
11                    level(right_rec) < level(current_rec)), but that right_rec is still lower than the initial starting point of search for
12                    contained record(s) (i.e., level(right_rec) > start_level) */
13                 make right_rec a child of the most recently created node that, in the reconstructed tree, is
14                 higher than right_rec;
15         }
16         current_rec = right_rec;
17         right_rec = record immediately next to current_rec, in the same direction as serialization;
18     } /* end "while" */
19     return records, of the reconstructed tree, at target_level;
20 } /* end "if" */
```

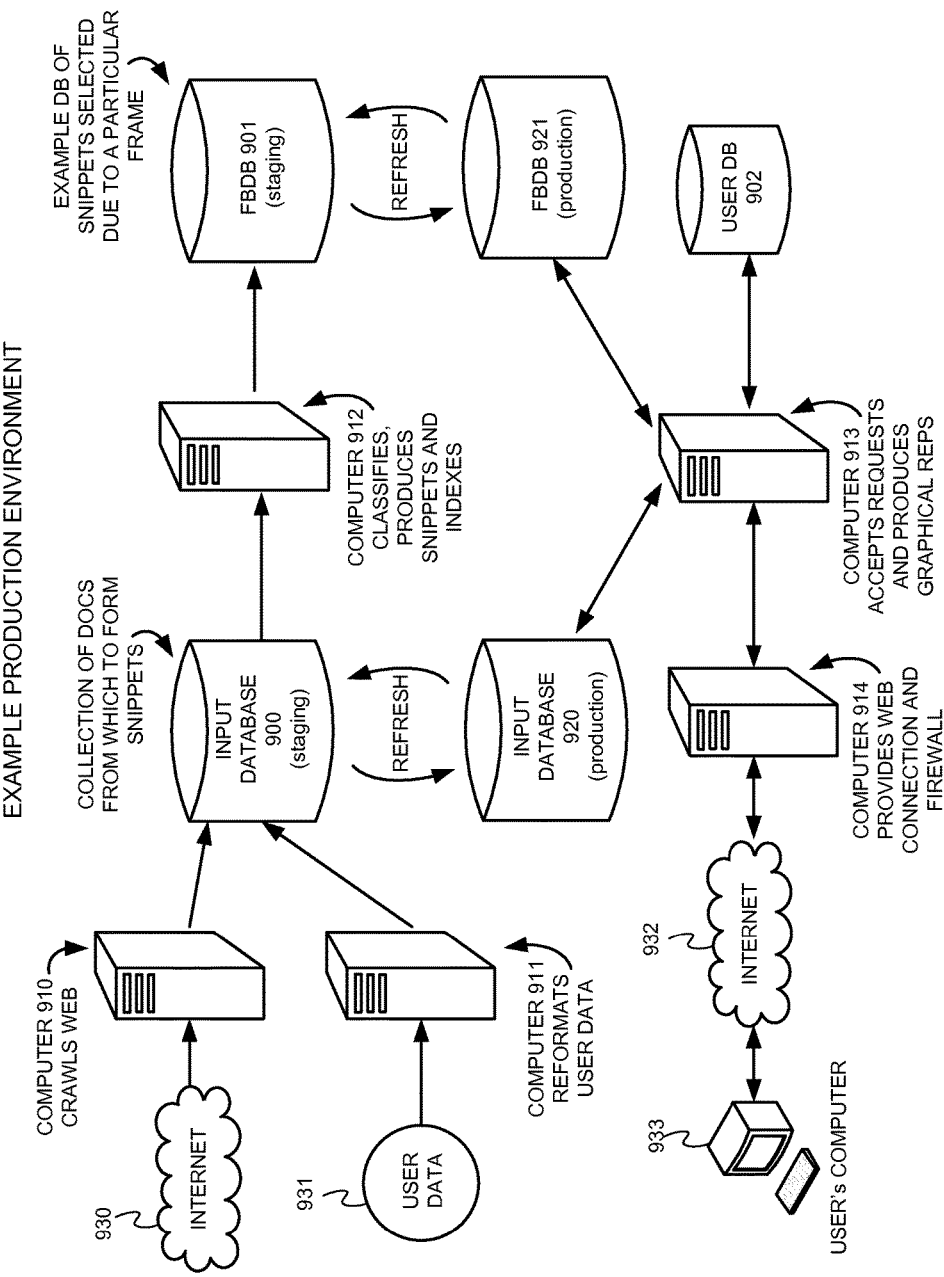

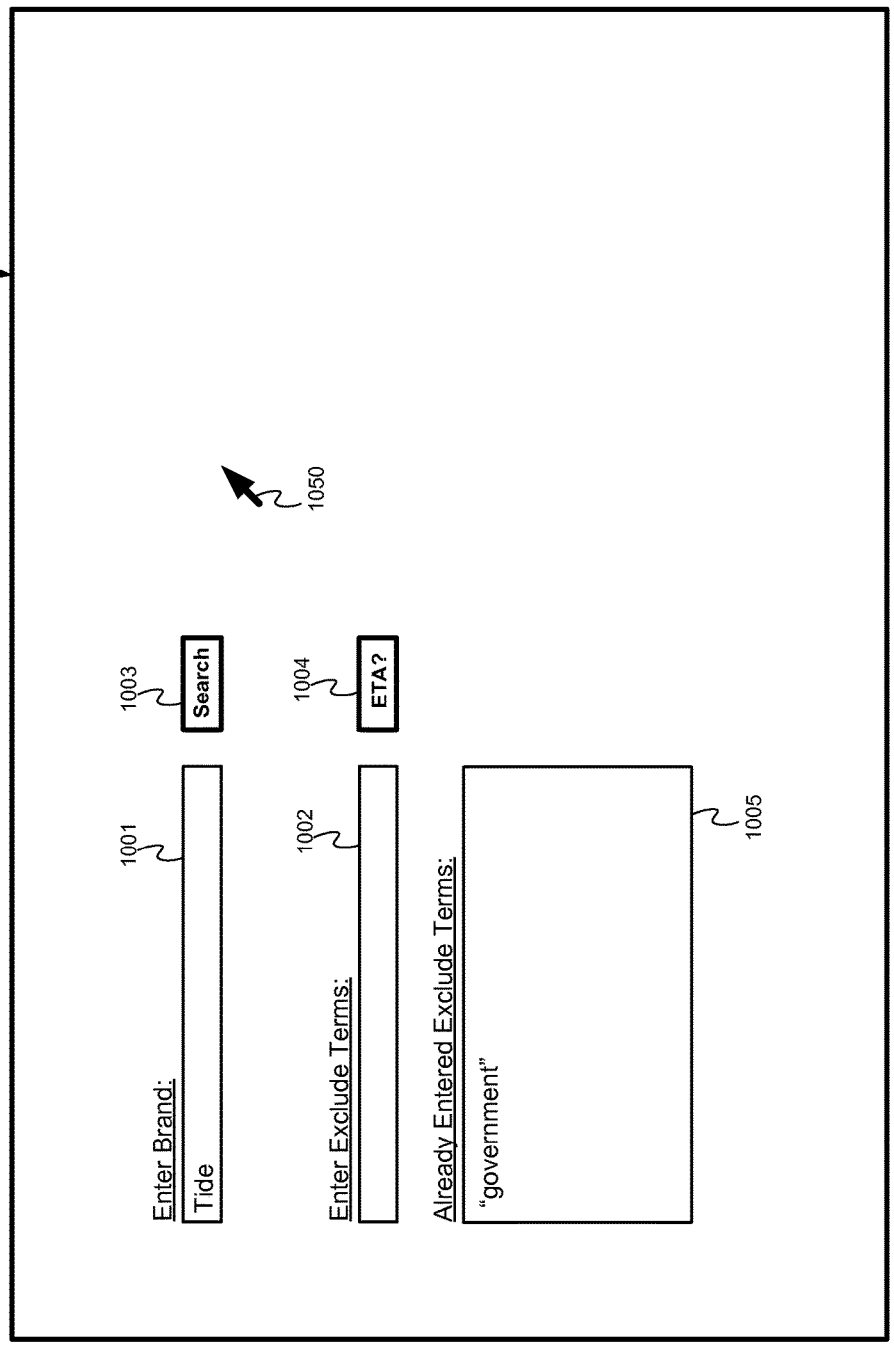

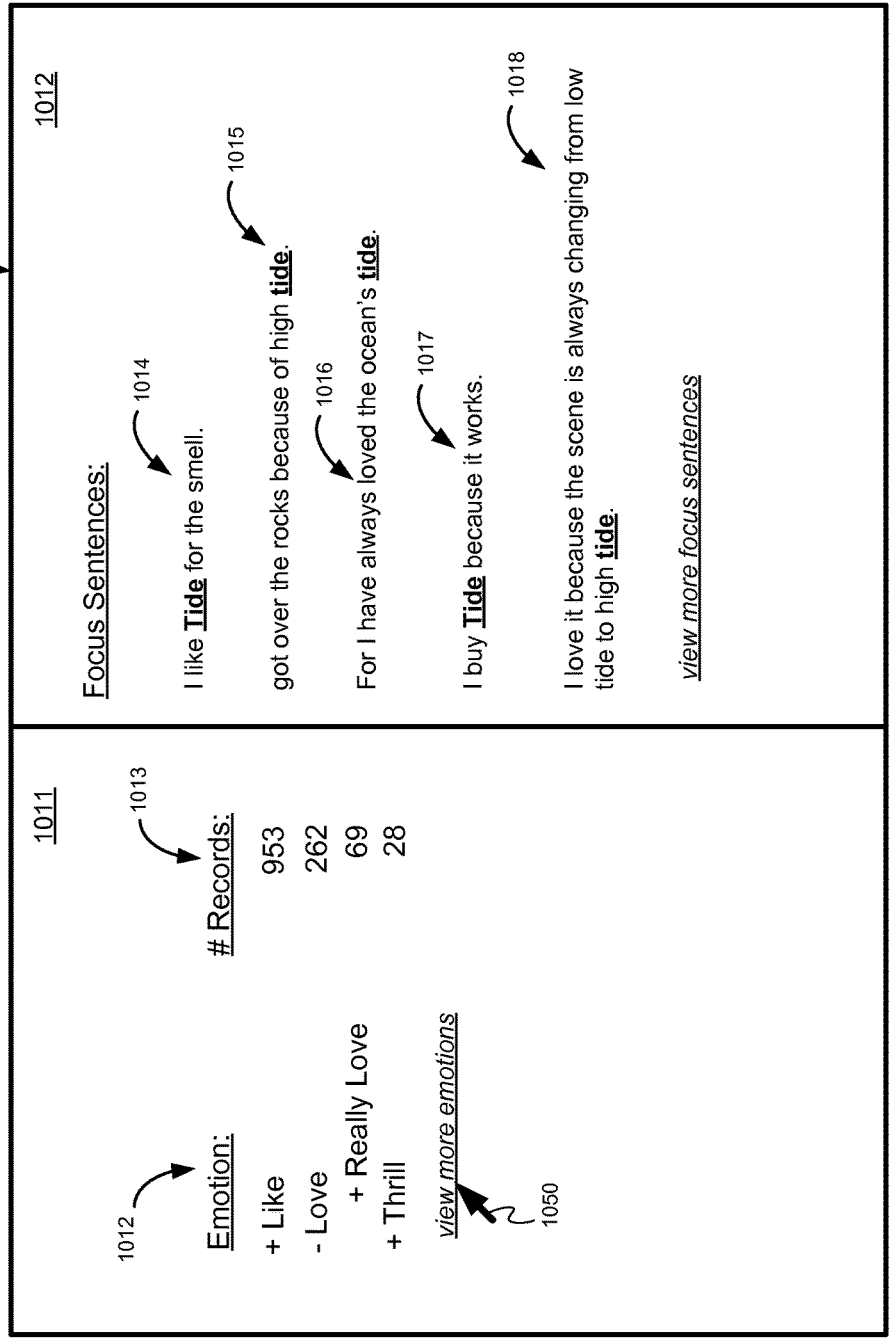

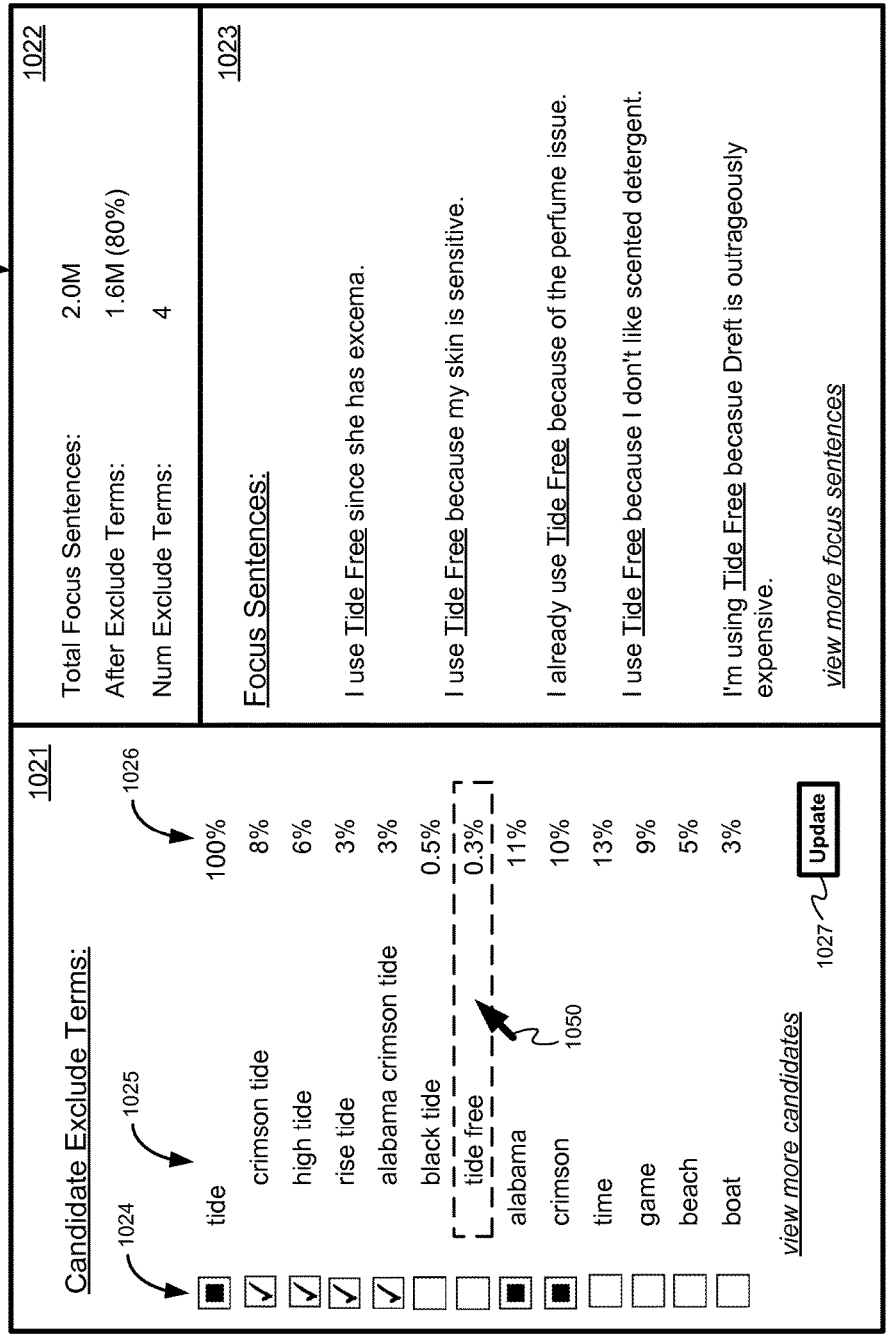

METHOD AND APPARATUS FOR QUERY FORMULATION

As provided for under 35 U.S.C. § 120, this patent claims benefit of the filing date of the following U.S. patent application, herein incorporated by reference in its entirety:

"Methods and Apparatuses For Clustered Storage of Information and Query Formulation," filed 2011 Oct. 24 (y/m/d), having inventors Mark Edward Bowles, Jens Erik Tellefsen, and Ranjeet Singh Bhatia, and App. No. 13280294.

CROSS REFERENCE TO RELATED APPLICATIONS

This application is related to the following U.S. patent application(s), which are herein incorporated by reference in their entirety:

"Method and Apparatus For Frame-Based Search," filed 2008 Jul. 21 (y/m/d), having inventors Wei Li, Michael Jacob Osofsky and Lokesh Pooranmal Bajaj and App. No. 12177122 ("the '122 Application");

"Method and Apparatus For Frame-Based Analysis of Search Results," filed 2008 Jul. 21 (y/m/d), having inventors Wei Li, Michael Jacob Osofsky and Lokesh Pooranmal Bajaj and App. No. 12177127 ("the '127 Application");

"Method and Apparatus For Determining Search Result Demographics," filed 2010 Apr. 22 (y/m/d), having inventors Michael Jacob Osofsky, Jens Erik Tellefsen and Wei Li and App. No. 12765848 ("the '848 Application");

"Method and Apparatus For HealthCare Search," filed 2010 May 30 (y/m/d), having inventors Jens Erik Tellefsen, Michael Jacob Osofsky, and Wei Li and App. No. 12790837 ("the '837 Application"); and "Method and Apparatus For Automated Generation of Entity Profiles Using Frames," filed 2010 Jul. 20 (y/m/d), having inventors Wei Li, Michael Jacob Osofsky and Lokesh Pooranmal Bajaj and App. No. 12839819 ("the '819 Application").

Collectively, the above-listed related applications can be referred to herein as "the Related Applications."

FIELD OF THE INVENTION

The present invention relates generally to the clustered storage of information, and more particularly to efficiently representing hierarchical information within a framework of records searchable by an inverted index. The present invention also relates generally to the formulation of queries and more particularly to the selection of exclusion terms.

BACKGROUND OF THE INVENTION

Inverted Index Databases (or IIDBs) are well known. An example IIDB is the well-known Open Source software "Lucene," that uses an inverted index to perform rapid searches of a collection of records (Lucene is provided by "The Apache Software Foundation," a not-for-profit Delaware corporation, with a registered office in Wilmington, Del., U.S.A.). IIDBs like Lucene are sufficiently efficient and scalable such that they can be used for searching a large-scale corpus, a function provided by web-accessed search engines.

A limitation of IIDBs like Lucene is that the only inherent structural relationship supported, between records, is the single-level linear collection. It should be noted that the basic item of indexed data, supported by generic Lucene (i.e., Lucene that lacks the present invention), is called a "document." However, herein, for purposes of generality, we shall refer to the basic item of indexed data as a "record." Each record of an IIDB is identified by a unique ID number (where Lucene currently has capability to store up to $2^{31}$ records, since the unique ID for each record is a 32 bit signed integer).

It would therefore be desirable to augment IIDBs to permit efficient representation of structural relationships, between records of an IIDB, that are more complex than just a single-level linear collection.

An important use of IIDBs is the searching of a "Corpus of Interest" (or C_of_I) for mentions of an "Object of Interest" (or O_of_I). A particular type of O_of_I is a brand of consumer products (also referred to herein as a "Consumer Brand" or "C_Brand"). C_Brands can be the subject of large-scale database searches, particularly of Internet content, by Brand Managers (persons responsible for the continued success of a C_Brand). In particular, a Brand Manager is often interested, for example, in the sentiment of consumers toward his or her C_Brand.

The names of many C_Brands, however, can be ambiguous.

Ambiguity, in a lexical unit, means that the same lexical unit can have two or more distinctly different meanings. Some example C_Brands, with ambiguous names, include the following:

"Tide":
    C_Brand meaning: a laundry detergent
    Example alternate meanings:
        the tide of the ocean
        a football team, called "Alabama Crimson Tide"
UPS:
    C_Brand meaning: a package-delivery service
    Example alternate meaning: a direction of motion away from the earth
Visa:
    C_Brand meaning: a credit card company
    Example alternate meaning: a official document allowing entry into a foreign nation It would therefore be highly desirable to provide techniques for the formulation of queries that are more precise at the identification of an O_of_I (such as a C_Brand), while still achieving a high level of recall.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIGS. 2A-2B show a fragment of a single-level linear collection, as could be maintained by an IIDB.

FIG. 3 shows an example representation, using four bit maps, of the basic structural information of the 15 records of FIGS. 2A and 2B.

FIGS. 4A-4B depict, in a general way, two main modes by which bit maps can be used.

FIG. 5 shows an example pseudo-coded "To" procedure.

FIGS. 6A-6B show an example pseudo-coded "Single_To" procedure.

FIG. 9 depicts an example production-level computer system design in which the techniques described herein can be applied.

FIG. 10A depicts a query-entry screen 1000, for the investigation of C_Brands.

FIG. 10B depicts a screen 1010, with the frame-based search results produced by investigation of the C_Brand "tide" for positive emotions.

FIG. 10C shows an example screen 1020, of the Exclude Term Assistant, when a Brand Manager is seeking to find Exclude Terms to improve a search for the Consumer Brand "tide."

DETAILED DESCRIPTION OF PREFERRED EMBODIMENTS

Figure 1B:
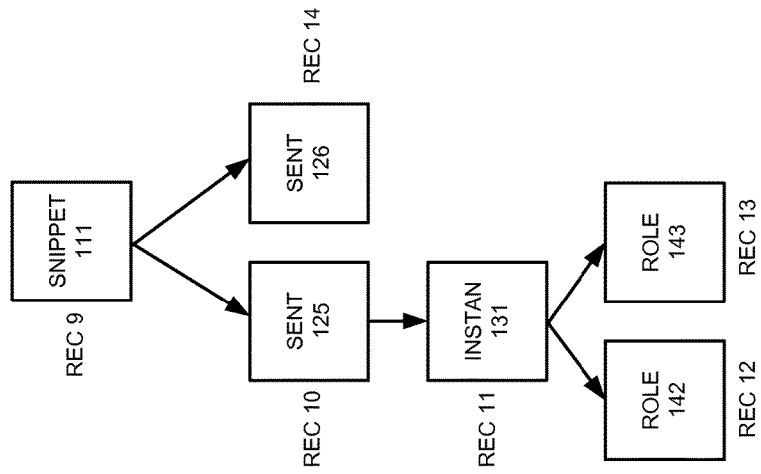
FIGS. 1A-1B graphically depict the hierarchical structure of first and second clusters.

Reference will now be made in detail to various embodiments of the invention, examples of which are illustrated in the accompanying drawings. Wherever possible, the same reference numbers will be used throughout the drawings to refer to the same or like parts.

Please Refer to the Section 4 ("Related Applications") and Section 5 ("Glossary of Selected Terms"), Included as the Last Two Sections of the Detailed Description, for the Definition of Selected Terms Used Below.

Table of Contents to Detailed Description

1 Clustered Storage
  1.1 First Embodiment
  1.2 Pseudo-code
    1.2.1 Mapping Up The Hierarchy
    1.2.2 Mapping Down The Hierarchy
2 Query Formulation
  2.1 Consumer Sentiment Search
  2.2 Exclude Term Assistant
    2.2.1 Search for Lexical Unit of Interest
    2.2.2 Focus Sentences to Role Values
    2.2.3 Down-sampling
    2.2.4 Frequency and Cluster Analysis
    2.2.5 User Selection of Exclude Terms
3 Computing Environment
4 Related Applications
5 Glossary of Selected Terms

1 Clustered Storage

1.1 First Embodiment

A first embodiment of the present invention permits efficient representation of structural relationships, between records of an IIDB, that are more complex than just a single-level linear collection. In particular, the present invention is directed to data storage situations where, at a local level, it is useful to view records as being organized into clusters. A "cluster" can encompass any kind of data organization that relies on relatively localized connections between its records. The structural organization for clusters focused upon herein is the hierarchical (or "tree") structure, but it should be understood that the present invention can be applied to clusters with other organizational arrangements.

The two basic types of operations, provided by an IIDB that lacks the present invention, are as follows. For simplicity of explanation, the operations are described as producing, or operating upon, ordered lists of record ID numbers. However, any suitable data structure, that provides functionally similar results, can be used.

1. Query Operations. Querying refers to the collection of operations where one or more keywords are matched, against an inverted index, in order to produce an ordered list of record ID numbers. Each member of the ordered list satisfies the query. In addition to permitting queries for individual keywords, a query language typically provides operators by which keywords can be required to have certain positions relative to each other (called herein "Positional" operators). For example, putting a sequence of two or more keywords within a pair of quotes often represents a kind of Positional operation. The pair of quotes indicate that the keywords within must all be found next to each other, and in the same order, for the expression to be satisfied. Another type of Positional operator is often referred to as the "Within" operator. A "Within" operator can take three arguments: a first argument that is a keyword (or a sequence of keywords, as indicated by a pair of quotes), a second argument that is a keyword (or a sequence of keywords, as indicated by a pair of quotes), and a third argument that specifies a maximum allowable distance, measured in words, between the first and second arguments.

2. Boolean combination, between ordered lists of record ID numbers, to produce a resulting ordered list of record ID numbers. Since Boolean operators produce and take as input the same type of data representation (e.g., an ordered list), they can be composed into arbitrarily complex expressions. Example Boolean operators include the following: AND, OR, and NOT.

To the two above-listed basic operations, the present invention adds an intra-cluster level-conversion capability, referred to herein as a "To" operator. Before explaining the "To" operator, it is useful to explain how localized clusters of data can be encoded within a single-level linear collection of records.

FIGS. 2A-2B, for example, show a fragment of a single-level linear collection, as could be maintained by an IIDB. This fragment consists of Records 0-14, where the ellipses, following Record 14, indicate that many more records could be part of the collection.

Records 0-14 have been divided into the following two clusters of records:

1. A first cluster of records, each identified with an ID number from the range 0-8, is shown in FIG. 2A.
2. A second cluster of records, numbered 9-14, is shown in FIG. 2B.

Figure 1A:
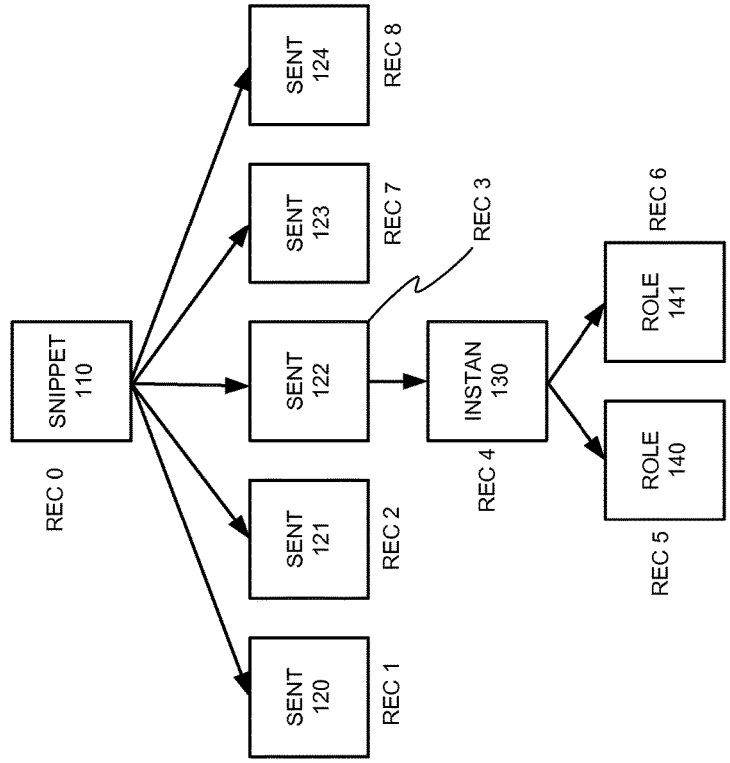

FIGS. 1A and 1B, respectively, graphically depict the hierarchical structure of the first and second clusters. The hierarchy shown has the following four levels (proceeding from top level to bottom level):

1. Snippet
2. Sentence
3. Instance
4. Role

While any collection of symbols can be used to denote the levels of a hierarchy, it is often useful to assign a unique integer to each level. For purposes of discussion herein, we shall follow the convention of assigning a zero to the highest level and increment, by one, the value representing each successive level. Therefore, the four levels discussed just-above can be represented as follows:

Snippet: 0
Sentence: 1
Instance: 2
Role: 3

As can be seen from the assignment of record ID numbers, in FIGS. 1A and 1B, each cluster is converted into a linear collection of records by visiting its records in a depth-first manner. The process, of converting a cluster of records into a linear collection of records, is also called herein "serialization." While the clusters of FIGS. 1A and 1B were serialized by visiting their records in a depth-first manner, any suitable visitation procedure can be used.

Even without the "To" operator, there are still a variety of operations that can be performed upon an IIDB of serialized clusters. For example, consider the four-level hierarchical clusters discussed just-above. Each level of the hierarchy can be given its own "class" of record, and each such class can be accessible by its own selection of indexed fields. An example class structure follows:

1. SnippetObj: Each record of type "SnippetObj" represents a snippet. Permits searching, by snippet content, at an indexed field called "Snippet."
   1.1. SentenceObj: Each record of type "SentenceObj" represents a sentence of its parent snippet.
       Permits searching, by sentence content, at an indexed field called "Sentence."
       Permits searching, for the focus sentence, at an indexed field called "Focus." The content of the "Focus" field can be either "True" or "False."
       1.1.1. InstanceObj: Each record of type "InstanceObj" represents an instance, for each frame found in its parent sentence. Permits searching, by frame type, at an indexed field called "FrameType."
           1.1.1.1. RoleObj: Each record of type "RoleObj" represents a role of its parent instance. Permits searching, by role value content, at indexed field "Value."

(In the above class structure, it can be seen that the class names include an "Obj" suffix. This suffix is used to indicate a relationship to Object-Oriented Programming. The suffix is not intended to indicate, as that term is discussed in below Section 2, "Query Formulation," that they are "Objects of Interest" for which a user desires to formulate a query.)

Using the above-defined class structure, following are four example IIDB search queries (where each query is followed by explanatory commentary):

SnippetObj.Snippet='Tide'
    Finds all snippets that have the word "Tide"
SentenceObj.Focus='True'
    Finds all the focus sentences of all snippets
InstanceObj.FrameType='Like'
    Finds all instances of the "Like" Frame
RoleObj.Value='crimson tide'
    Finds all role values that contain the phrase "crimson tide"

Further, Boolean operators can be used to combine search queries. For example, the following query finds all focus sentences that have the word "Tide":

AND(SentenceObj.Focus='True',
    SentenceObj.Sentence='Tide')

To the above, the "To" operator adds the ability for a query result, at one level of a cluster hierarchy, to be translated into its equivalent form at another level the cluster hierarchy.

The "To" operator receives (either explicitly or implicitly) at least two parameters:

1. First parameter: an ordered list of record ID numbers. Each ID number is interpreted as representing a record at a same particular level in a cluster. If the clusters are hierarchical, the level of a record "n" is typically the least number of edges to traverse, from the root, to reach "n." There is a common level, for each ID number of the first parameter, and it is called a "start level." For example, with respect to FIGS. 2A and 2B, assume the first parameter, input to a "To" operator, is the following list of record ID numbers: (4, 11). In that case, each ID number represents an "Instance" level record (because Record 4 represents Instance 130 and Record 11 represents Instance 131).
2. Second parameter: a target level. Can be expressed in an absolute or relative way.

For each record "r" of the first parameter, the "To" operator does the following:
1. the cluster "c," to which "r" belongs is identified;
2. the record or records of "c" that correspond to "r," at the target level, are identified.

If the clusters are hierarchical, there are two main possibilities:
1. target level>start level: In this case, there can be >1 records, at the target level, each of which is descendent of "r." Being a descendent of "r" can also be referred to as being contained within the scope of "r."
2. target level<start level: In this case there can only be one record, at the target level, that is an ancestor of "r." An ancestor of "r" can also be referred to as the record, at the target level, that contains "r" within its scope.

To continue with the same example of ID numbers (4, 11), discussed just-above, an example target level, for these instances, could be the "role" level. Conversion of the ID numbers (4, 11), from the instance to role level, produces the following list of ID numbers: (5, 6, 12, 13). In the form of an IIDB query expression, the example can be expressed as follows:

To (+1, InstanceObj.FrameType='Like')

The above "To" expression can be analyzed as follows:
The second parameter is the ordered list of record ID numbers. For the particular expression shown above, it is the set of all instances of the "Like" Frame.
The first parameter specifies the target level. For the above expression, the first parameter is assumed to be relative and going one step lower in the hierarchy (i.e., going from parent to child) is assumed to increase the level number by one.

The two parameters work together as follows: for each record indicated by the second parameter, convert its child records (which are the equivalent record or records at the next level lower for each cluster's hierarchy).

The above example "To" expression can be related, as follows, to the above example of going from (4, 11) "To" (5, 6, 12, 13). We will assume that Record 4 (or instance 130), of FIGS. 1A and 2A, is an instance of the "Like" Frame. We will also assume that Record 11 (or instance 131), of FIGS. 1B and 2B, is an instance of the "Like" Frame. Thus, going to the next lower level, for Record 4, means finding Records 5 and 6, while going to the next lower level, for Record 11, means finding Records 12 and 13.

Conversion of ID numbers, from their starting level in a hierarchy to the equivalent ID numbers at a target level, requires that at least the following basic structural information is preserved in the serialization:
1. The level, in the hierarchy, of each record. In FIGS. 2A and 2B, this is known from the labels kept with each record. For example, for the example Record ID numbers (4, 11), each such Record is labeled as an "instance" (abbreviated "INSTAN").

2. The location of each record, in the serialization sequence.

The two above-listed types of information, along with knowing the visitation procedure (e.g., depth-first) by which a serialization sequence was produced, is sufficient to accomplish the "To" operation. To make the "To" operation as fast as possible, so that it can be applied (for example) to search results produced from the querying of very large databases, both types of basic structural information can be preserved with bit maps.

FIG. 3 shows an example representation, using four bit maps, of the basic structural information of the 15 records of FIGS. 2A and 2B. As can be seen, each level of the hierarchy (snippet, sentence, instance, role) is represented with its own bit map. Each bit in a bit map (or each "column" across the set of four bit maps) corresponds, by virtue of its position, to a record ID number. Regarding the above-discussed list (4, 11), it can be seen that each record ID number is represented (in FIG. 3) by a "1" bit, in the "instance" bit map, at the columns for records 4 and 11.

If the clusters are hierarchical, FIGS. 4A-4B depict, in a general way, the two main modes by which bit maps are used. For each of these Figures, the following conventions are used:

Each bit, of a bit map, is represented by a circle.
Each horizontal dotted line represents a bit map.
The hierarchical level, represented by each bit map, increases from bottom to top.
Record ID number increases from left to right.
The bits, representing the start level records, are processed from right to left. In the diagrams, this is labeled the "Inter start record order."

A discussion, of each of FIGS. 4A-4B, follows:

1. target level<start level: Illustrated by FIG. 4A. In this case each bit, of "start level" bit map, is pursued up the hierarchy of its cluster, until its single ancestor, at the target level, is found. In particular, FIG. 4A shows two bits 413 and 412, at the start level. For each of these bits, its ancestor bit, respectively bits 411 and 410, is found. An ancestor bit is found by a right to left traversal of the bit maps (labeled in the FIG. 4A as the "Intra start record order").

2. target level>start level: Illustrated by FIG. 4B. In this case each bit, of "start level" bit map, is pursued down the hierarchy of its cluster, until its descendent bit or bits, at the target level, are found. In particular, FIG. 4A shows two bits 415 and 414, at the start level. For each of these bits, its descendent bits (418 and 419 for 415; 417 and 416 for 414) are found. A descendent bit is found by a left to right traversal of the bit maps (labeled in FIG. 4B as the "Intra start record order").

1.2 Pseudo-Code

Example pseudo-code, for interpreting bit maps of similar structure to that shown in FIGS. 3 and 4A-4B, is depicted in FIGS. 5 and 6A-6B.

Line 1 of FIG. 5 shows that the example pseudo-coded "To" procedure takes the following two parameters:

1. rel_target_level: A target level in cluster hierarchy, for each record of the input list of records, to be mapped to. For the version of the "To" operator shown herein in the pseudo-code, the target level is input as a relative value: the target level is determined by adding rel_target_level (which can be either positive or negative) to the "start level." As discussed above, the start level is the common level, in each cluster's hierarchy, for each record of the input list of records. (A will be seen below, the non-relative start level is represented, in the pseudo-code, by the variable "start_level" of FIGS. 6A-6B.)

2. recs_2b_mapped: The input list of records to be mapped.

The "To" procedure returns (see line 18 of FIG. 5) a list of records that have been mapped to the target level. A line-by-line discussion of FIG. 5 (and its supporting procedure "Single_To") follows.

FIG. 5 handles the two main cases of the "To" procedure as follows:

1. target level<start level: Addressed by FIG. 5, lines 5-12.
2. target level>start level: Addressed by FIG. 5, lines 13-16.

For either case, the "To" procedure calls the "Single_To" procedure (either at line 10 or 14 of FIG. 5). Line 1 of FIG. 6A shows that the example pseudo-coded "Single_To" procedure takes the following three parameters:

1. rel_target_level: Same meaning as for "To" procedure discussed above.
2. start_rec: Set to a single record (selected by "To" from the input list of records) to be mapped. Also referred to as the "start record."
3. addi_results: This parameter is useful as an efficiency measure, when Single_To is asked to map the start record to its higher level ancestor record. Such ancestor record is also referred to herein as the "target record." The target record can also be the ancestor record to other records of the "To" procedure's input list. As will be discussed further below, Single_To finds the target record by reconstructing at least part of the original hierarchy (between the start record and the target record) that had been serialized into the IIDB. Once Single_To has found the target record it can also check the reconstructed hierarchy to see whether such hierarchy contains any additional records, of the same level as the start record, for which target record is also the ancestor record. Such additional records are returned through the addi_results parameter.

The "Single_To" procedure returns (see line 23 of FIG. 6A and line 19 of FIG. 6B) a list of records that have been mapped to the target level. "Single_To" is similar to "To" in the sense that it is also structured into two main sections, depending upon which, target level or start level, is greater:

1. target level<start level: Addressed by FIG. 6A, lines 6-24. In this case, for the input start record, the "Single_To" operator is seeking the one record, higher in a cluster's hierarchy, that contains it (also called its ancestor record).
2. target level>start level: Addressed by FIG. 6B, lines 1-20. In this case, we start with an ancestor record, and the "Single_To" operator seeks those one or more records, at some lower level in a cluster's hierarchy, that are contained by such ancestor record.

A line-by-line discussion of "Single_To" follows.

1.2.1 Mapping Up The Hierarchy

For purposes of example, let us first assume that Single_To has been invoked as follows on the IIDB of FIGS. 2A-2B:

1. relative target level=−3
2. start record=Record 6
3. additional results=null

Single_To starts by initializing the start and target levels (FIG. 6A, lines 2-3). The function "level" can operate, for example, by consulting the bit maps at the record ID number indicated by the record passed to it as a parameter. For a start record of Record 6, the "level" function (of line 2) can examine column 6, of the bit maps of FIG. 3, and determine that its level is "3" (also known as the "role" level). The target level is then set to "0."

Next, Single_To prepares for its reconstruction, of at least part of a cluster's serialized records, by setting the current record to the start record (FIG. 6A, line 4). This means, for our example, that current_rec points to Record 6.

If the target level is less than the start level, cluster reconstruction is performed by the "while" loop of lines 7-21. For the example, since 0<3, this "while" loop is executed.

The "while" loop will perform a first execution, of the loop body, if its test (line 7) is satisfied. In our example, since 3≠0, a first iteration is begun.

For purposes of the pseudo-code, serialization is assumed to be done in a depth-first "left to right" order. Thus, reconstructing a cluster's hierarchy in an upwards fashion, when starting from the start record, involves a step-by-step accessing of records in a "leftwards" direction. In the example, this ordering can be seen when viewing FIGS. 2A-2B and 3. To begin the upwards reconstruction, the record to the left (the "left record" or "left_rec") of the current record is found (line 8). For the example, left_rec is set to Record 5. The left record is subjected to three tests:
1. level of left record=level of current record (line 9): If this test is satisfied, we know that the left record is a sibling of the current record. For the example, we can see (particularly clearly in FIG. 1A) that Record 5 and 6 are siblings.
2. level of left record<level of current record (line 11): If this test is satisfied, we know that the left record is the parent of the current record. Also, since we do not know what iteration of the "while" is being executed, we need to check whether the left record is the parent of any other records, already visited, that are at the same level as the current record.
3. level of left record>level of current record (line 16): If this test is satisfied, we know that the left record is starting, with respect to the current record, a new sub-tree of the cluster's hierarchy. Also, because of the depth-first serialization, we know that the current record will be a sibling of any other records found at the same level of the current record.

Figure 7A:
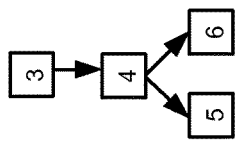
FIGS. 7A-7F are a diagrammatic representation of the reconstructed portions of a cluster that can be produced, by successive iterations of a "while" loop, when mapping towards higher levels of the cluster.

Now that the current record has been processed, the left record is made the new "current record" (line 20) and the second iteration of the "while" is started. A diagrammatic representation, of the reconstruction produced by the first "while" iteration, when processing the example, is shown in FIG. 7A.

Successive iterations of the "while" loop (of FIG. 6A, lines 7-21) are performed, until the level of the current record is the same as the target level. For the example, diagrammatic representations, of successive iterations, are shown in FIGS. 7B-7F.

FIGS. 7A-7F represents each record, with respect to FIG. 1A, in simplified form: each record is labeled only with its record ID number. Where two or more records are marked as being siblings, for purposes of their later connection through a parent, this is indicated by the abbreviation "SIB."

Figure 7B:
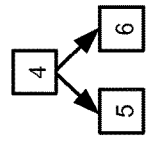

Briefly, each of the following iterations can be described as follows:

Iteration 2:
   current record=Record 5
   left record=Record 4
   level of left record (level 2)<level of current record (level 3), so Records 5 and 6 are made children of Record 4 (see FIG. 7B)

Figure 7C:
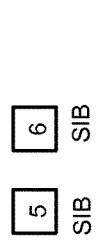

Iteration 3:
   current record=Record 4
   left record=Record 3
   level of left record (level 1)<level of current record (level 2), so Record 4 is made child of Record 3 (see FIG. 7C)

Figure 7D:
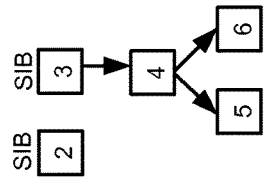

Iteration 4:
   current record=Record 3
   left record=Record 2
   level of left record (level 1)=level of current record (level 1), so Records 2 and 3 are marked as siblings (see FIG. 7D)

Figure 7E:
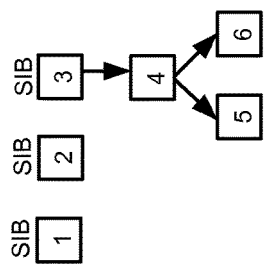

Iteration 5:
   current record=Record 2
   left record=Record 1
   level of left record (level 1)=level of current record (level 1), so Records 1 and 2 are marked as siblings (see FIG. 7E)

Figure 7F:
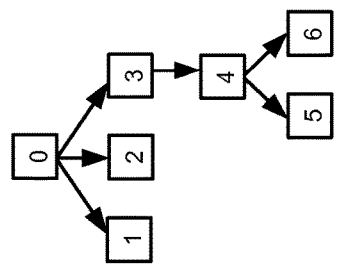

Iteration 6:
   current record=Record 1
   left record=Record 0
   level of left record (level 0)<level of current record (level 1), so Records 1-3 are made children of Record 0 (see FIG. 7F)

When attempting to start iteration 7, since the current record is Record 0, the condition of the "while" is not satisfied (because level (Record 0)=target_level). Therefore, the "while" loop ends with the reconstruction being shown in FIG. 7F. As can be seen from FIG. 7F, "addi_results" is set to Record 5 (by line 22 of FIG. 6A) and Record 0 is the returned value (by line 23 of FIG. 6A).

Thus, "Single_To" has mapped Record 6 to Record 0 and Record 5 is available as an additional result. This additional result could be useful, for example, if the "To" procedure was called with an input list (or "recs_2b_mapped") that included both Records 5 and 6. As can be seen from FIG. 5, the "To" procedure steps through the input list (the "for" loop at line 4) in a direction reverse to serialization. Thus, Single_To would be called with Record 6 as its parameter before Record 5. Following the call to Single_To with Record 6, the "for" loop would set rec_current to Record 5. In this case, the "if" of line 6 (of FIG. 5) is satisfied, resulting in Record 5 being immediately added (by line 7) to the result to be returned, without calling Single_To. Then (because of line 8 and its "go directly" command) the "for" loop can proceed directly to the next record (of recs_2b_mapped) to be processed.

1.2.2 Mapping Down the Hierarchy

In order to explain the portion of the Single_To procedure, illustrated by FIG. 6B, it is assumed that it has been invoked as follows on the IIDB of FIGS. 2A-2B:
1. relative target level=+3
2. start record=Record 0
3. additional results=null This is essentially the opposite of the example discussed above for FIG. 6A.

As was the case with the previous example of mapping up the hierarchy, Single_To starts by initializing the start and target levels (FIG. 6A, lines 2-3). For Record 0, the "level"

function can examine column 0, of the bit maps of FIG. 3, and determine that its level is "0" (also known as the "snippet" level). The target level is then set to "3."

Next, the Single_To procedure prepares for reconstruction, of at least part of a cluster's serialized records, by setting the current record to the start record (FIG. 6A, line 4). This means, in the example, that current_rec points to Record 0.

If the target level is greater than the start level (see "if" of FIG. 6B, line 1), cluster reconstruction is performed by the "while" loop of FIG. 6B, lines 3-18. As was discussed above, for purposes of the "To" and "Single_To" pseudocode, serialization is assumed to have been done in a depth-first "left to right" order. Thus, reconstructing a cluster's hierarchy in a downwards fashion, starting from a start record, involves step-by-step accessing of records in a "rightwards" direction. To begin the downwards reconstruction, the record to the right (the "right record" or "right_rec") of the current record is found (FIG. 6B, line 2). The "while" loop (line 3) ends when the right record (the next record to be analyzed) is at a same or higher level, in the hierarchy, than the start level.

For the example, the "if" of FIG. 6B, line 1 is satisfied (since 3>0). The right record is set to Record 1, and each iteration of the loop executes as follows. (In the following listing of iterations, it should be noted that FIGS. 8A-8F follow a similar formatting to FIGS. 7A-7F: each record, with respect to FIG. 1A, is shown in simplified form where it is labeled only with its record ID number.)

Figure 8A:
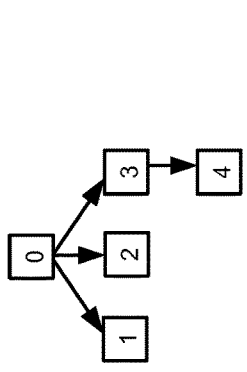
FIGS. 8A-8H are a diagrammatic representation of the reconstructed portions of a cluster that can be produced, by successive iterations of a "while" loop, when mapping towards lower levels of the cluster.

Iteration 1:
   current_rec=Record 0
   right_rec=Record 1
   Since level of Record 1>level of Record 0 (line 4), the right record is made a child of the current record. This reconstruction is shown in FIG. 8A.

Figure 8B:
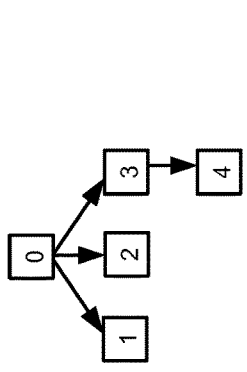

Iteration 2:
   current record=Record 1
   right_rec=Record 2
   Since level of Record 2=level of Record 1, Record 2 is made a sibling of Record 1. This reconstruction is shown in FIG. 8B.

Figure 8C:
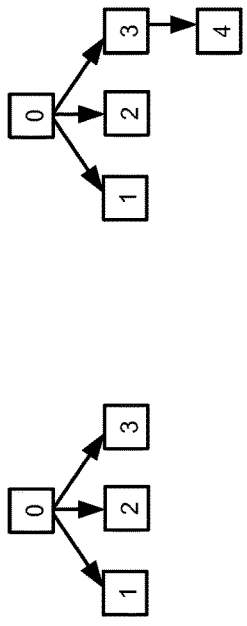

Iteration 3:
   current record=Record 2
   right_rec=Record 3
   Since level of Record 3=level of Record 2, Record 3 is made to be a sibling of Record 2. This reconstruction is shown in FIG. 8C.

Figure 8D:
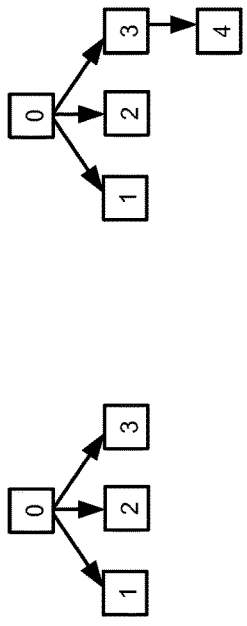

Iteration 4:
   current record=Record 3
   right_rec=Record 4
   Since level of Record 4>level of Record 3, the right record is made a child of the current record. This reconstruction is shown in FIG. 8D.

Figure 8E:
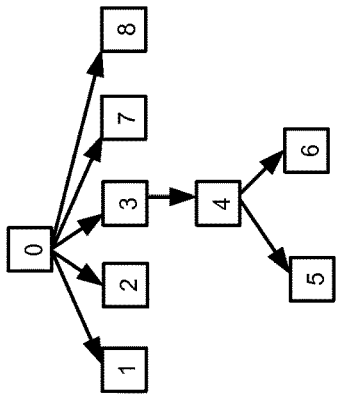

Iteration 5:
   current record=Record 4
   right_rec=Record 5
   Since level of Record 5>level of Record 4, the right record is made a child of the current record. This reconstruction is shown in FIG. 8E.

Figure 8F:
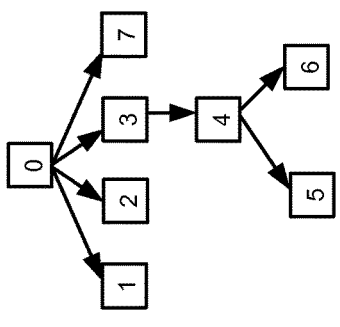

Iteration 6:
   current record=Record 5
   right_rec=Record 6
   Since level of Record 6=level of Record 5, Record 6 is made to be a sibling of Record 5. This reconstruction is shown in FIG. 8F.

Figure 8G:
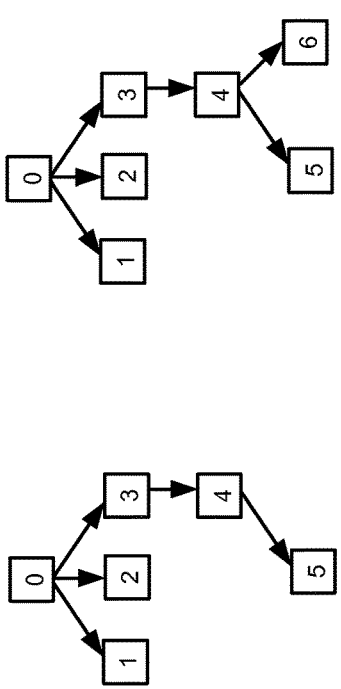

Iteration 7:
   current record=Record 6
   right_rec=Record 7
   While the level of the right records jumps to a smaller value, from 3 to 1, it is still greater than the start level, so the "while" loop continues.
   Since level of Record 7<level of Record 6, line 6 is satisfied. Further, since there is not equality, between the levels of Records 6 and 7, the "else" of line 9 is performed.
   Since Record 0 is the most recently created record that, in the reconstructed tree, is higher than Record 7, Record 7 is made a child of Record 0 (see FIG. 8G).

Iteration 8:
   current record=Record 7
   right_rec=Record 8
   Since level of Record 8=level of Record 7, Record 8 is made to be a sibling of Record 7. This reconstruction is shown in FIG. 8H.

Figure 8H:
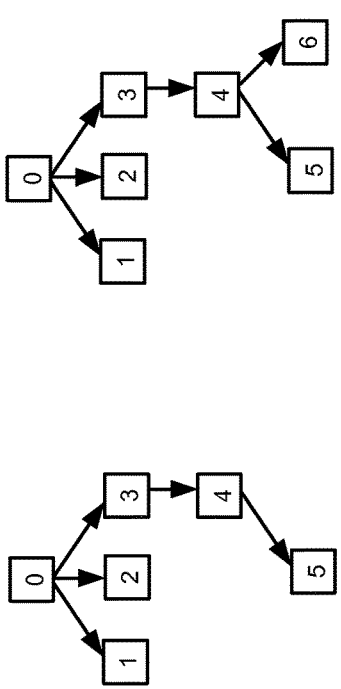

Preparation for iteration 9:
   current record=Record 8
   right_rec=Record 9
   Since level of Record 9 (see FIGS. 1B and 3) is equal to the start level, the "while" loop ends, leaving FIG. 8H as the final reconstructed tree.

In terms of returning a value for "Single_To," line 19 returns those records (Records 5 and 6) of the reconstructed tree that are at the target level (of level 3).

2 Query Formulation

2.1 Consumer Sentiment Search

Distinguishing a usage of a lexical unit that is intended to refer to an "Object of Interest" (O_of_I), from a usage of a lexical unit that is intended to refer to something other than the O_of_I, can be greatly assisted by the inclusion of "Exclude Terms" in a search query.

In general, an Exclude Term can be defined as follows. It is a term that can be included as part of a query where, if the term is found in a record of an IIDB, that record is excluded from inclusion in the search result.

The present invention, for the formulation of Exclude Terms for inclusion in a database query, can be applied to any "Corpus of Interest" (C_of_I) for which mentions, of an O_of_I, are to be identified. A particular type of search, to provide an example where the present invention can be utilized, is presented in this Section 2.

The particular type of O_of_I is a brand of consumer products (also referred to herein as a "Consumer Brand" or "C_Brand"). C_Brands can be the subject of large-scale database searches, particularly of Internet content, by Brand Managers (persons responsible for the continued success of a C_Brand). In particular, a Brand Manager is often interested, for example, in the sentiment of consumers toward his or her C_Brand.

A C_of_I can be collected and searched for mentions of the O_of_I. In the case of a C_Brand, an example C_of_I can be a database that represents the collection, in a large scale and comprehensive way, of postings (such as "tweets" on Twitter) to Social Media (SM) web sites or services. We can refer to such Social Media database as "SM_db."

As has been described in the above-referenced Related Applications (please see Cross Reference to Related Applications), a frame-based search tool can be provided, by which instances of an O_of_I can be sought, in a C_of_I, in connection with a particular type of concept or concepts. More particularly, a Brand Manager can be provided with a frame-based search tool by which instances of a C_Brand can be sought, in a SM_db, in connection with a particular type of concept. For purposes of example herein, the "concept" presented is that of a consumer expressing the fact that he or she "likes" a C_Brand.

An example set of roles, for a "Like" frame, are as follows (each role name is in capitals, with a brief explanation following):

AGENT: The entity that expresses the "liking."
OBJECT: The object (for example a C_Brand) towards which the "liking" is expressed.
EMOTION: A particular positive emotion, if any, expressed by the Agent towards the Object.
BEHAVIOR: A particular positive behavior, if any, expressed by the Agent towards the Object.
ASPECT: A particular positive quality or property, if any, expressed by the Agent towards the Object.

The above "Like" frame is typically applied to the analysis of an individual sentence (referred to herein as the "focus sentence"). Following is an example focus sentence, to which appropriate Natural Language Processing (NLP) can be applied to produce an instance of the "Like" frame. The following example sentence discusses a fictitious brand of soda called "Barnstorm":

"My children love Barnstorm Soda and buy it all the time because of its taste."

Given a suitable NLP analysis, by application of suitable frame extraction rules, the following instance of the "Like" frame can be produced:

AGENT: "My children"
OBJECT: "Barnstorm Soda"
EMOTION: "love"
BEHAVIOR: "buy"
ASPECT: "taste"

In addition to the focus sentence, each post to Social Media can be summarized as a three sentence "snippet," with the focus sentence forming the middle sentence. A single type of record, let us call it "SentenceObj," can include both the focus sentence and the snippet as fields. These fields can be called, respectively, "FocusSentence" and "Snippet," with each field being indexed and therefore available for queries. Thus, when searching for all SentenceObjs, that satisfy a particular query, there are at least two indexes that can be used. As an example, if the FocusSentence index is to be searched for all occurrences of the word "Tide" and the Snippet index is to be searched for all occurrences of the word "government," then an IIDB syntax, for expressing these queries, can be (respectively) as follows:

SentenceObj.FocusSentence='Tide'
SentenceObj.Snippet='Government'

In a similar manner to that discussed above (Section 1, "Clustered Storage"), each SentenceObj record, of the SM_db, can part of a separate "cluster" of an IIDB. Including to the SentenceObj, the cluster can be hierarchically organized to contain the following three record types:

2. SentenceObj: Primary purpose is to represent focus sentence of snippet.
   Permits searching, by focus sentence content, at indexed field "FocusSentence."
   Permits searching, by snippet that includes the focus sentence, at indexed field "Snippet."
   2.1. InstanceObj: Represents an instance, for each frame found in focus sentence. Permits searching, by frame type, at indexed field "FrameType."
      2.1.1. RoleObj: Represents the roles, for each instance. Permits searching, by role value content, at indexed field "Value."

This hierarchy of three record types can be referred to herein as the "Consumer Sentiment Hierarchy" or "CSH." To improve readability, of query expressions included below that use the CSH, "comments," in the style of the C Programming Language, may be included.

As has been discussed in the Related Applications, a large-scale database (such as the SM_db), and its indexes, is typically created before a user query is input. The IIDB of the present application, however, can differ from those discussed in the Related Applications because of the cluster storage invention of above Section 1 ("Clustered Storage").

A user can formulate a query by identifying lexical unit or units representative of the O_of_I (e.g., a C_Brand). For purposes of example, it is assumed that the O_of_I is identified by only one lexical unit. Further, for purposes of example, we will address the C_Brand called "Tide" (a brand of laundry detergent) and assume it is to be identified, by a Brand Manager, by the single lexical unit "Tide."

All focus sentences, of the SM_db, can be searched for usage of the lexical unit "Tide." Based upon the CSH, the following query can return all resulting focus sentences:

SentenceObj.FocusSentence='Tide'

If a user has already identified an Exclude Term, to be used in conjunction with the search query, it can also be utilized. All focus sentences, where its snippet contains at least one Exclude Term, can be excluded from the search results. For example, based upon the CSH, the following query can return the list of all focus sentences where its snippet contains the Exclude Term "Government":

SentenceObj.Snippet='Government'

Using the "NOT" operator, according to the following expression, the above ordered list (of focus sentences where its snippet contains the Exclude Term) can be converted to the list of focus sentences where its snippet does not contain the Exclude Term:

NOT(SentenceObj.Snippet='Government')

Finally, the Exclude Term can be applied to the above-listed search for "Tide" with the AND operator:

AND(
  NOT(SentenceObj.Snippet='Government'),
  SentenceObj.FocusSentence='Tide'
)

An example user interface, for entering this type of search is shown in FIG. 10A. FIG. 10A depicts a query-entry screen 1000, for the investigation of C_Brands, that contains the following items:

Search term entry box 1001: one or more lexical units, each of which if found in a focus sentence is regarding as indicating a possible occurrence of a C_Brand, are entered here. In the diagram, only the single lexical unit "Tide" is shown. A search, based on the lexical units of box 1001, can be initiated by a user selecting the "Search" button 1003 with mouse pointer 1050.

Exclude term entry box 1002: one or more lexical units, each of which if found in a focus sentence's snippet is used to exclude that focus sentence, are entered here. In the diagram, only the single lexical unit "Government" is shown. The following section (Section 2.2) describes a tool, called "Exclusion Term Assistant" (or ETA), that can be used to help identify Exclude Terms. Use of this ETA can be initiated by a user selecting the "ETA" button 1004 with mouse pointer 1050.

For each focus sentence found, the "To" operator (discussed above in Section 1, "Database Storage") can be applied twice:
1. To go from the set of focus sentences "To" the instance of the "Like" frame (if any) found to have occurred in such sentence.
2. For each "Like" instance found, to go from the instance "To" a particular role or roles of such instance.

For purposes of example, we will assume that the role of interest, for the "Tide" brand, is "Emotion." It is assumed that the Brand Manager wishes to know all the positive emotions consumer associate with "Tide."

Going from the set of focus sentences "To" the set of all instances within such focus sentences can be accomplished with the following expression:

```
To (
    +1,
    AND(
        NOT(SentenceObj.Snippet = 'Government'),
        SentenceObj.FocusSentence = 'Tide'
    ) /* end AND */
) /* end First "To" */
```

The set of all instances of the "Like" frame can be found from the following:
InstanceObj.FrameType = 'Like'
The set of instances, within the selected focus sentences, can be limited to those of the "Like" frame by combination of the above-two expressions with the AND operator:

```
AND (
    To (
        +1,
        AND(
            NOT(SentenceObj.Snippet =
                'Government'),
            SentenceObj.FocusSentence = 'Tide'
        )
    ), /* end First "To" */
    InstanceObj.FrameType = 'Like'
) /* end outer AND */
```

The role values, of the "Like" frames, can be found by use (as described above) of a second "To" in the following expression:

```
To (
    +1,
    AND (
        To (
            +1,
            AND(
                NOT(SentenceObj.Snippet =
                    'Government'),
                SentenceObj.FocusSentence =
                    'Tide'
            )
        ), /* end First "To" */
        InstanceObj.FrameType = 'Like'
    ) /* end outer AND */
) /* end Second "To" */
```

For clarity of explanation, the above expression can be represented, symbolically, by the identifier "ROLE_VALUES_SEARCH_RESULT."

The different role values found can be subjected to grouping analysis. In grouping analysis, similar roles values can be put into a single group and the group given a generic name (or "g_name"). For the particular example, the following are several role values that can be placed in a common group:

love
really love
really always love

The common lexical unit, among a group of role values, can be identified. For the example above, the common lexical unit is "love." Thus, all three role values can be presented to the user (e.g., the Brand Manager) as a single emotion of interest "love."

Grouping can continue recursively, with subgroups being identified within a group. For the example above, it can be seen that "really love" can be identified as a subgroup of "love."

In addition to placing role values into groups, and presenting generic role value names (or g_name's) to the user, the order of presentation of such g_name's can be determined by the frequency with which each such g_name appears in the search result. Thus, for example, if the g_name "like" represents 953 focus sentences (where each of the 953 focus sentences contains at least one occurrence of the word "like"), and the g_name "love" represents only 262 focus sentences, then the g_name "like" is presented before the g_name "love."

An example user interface, for presenting such g_names is shown in FIG. 10B. FIG. 10B depicts a screen 1010, for the investigation of C_Brands, that contains the following sub-panes:

Sub-pane 1011: Contains two columns, 1012 and 1013. Column 1012 lists the example g_names discussed above, for the emotions "Like," "Love," and "Thrill." Column 1013 lists, for each corresponding g_name, the number of focus sentences in which it appears. Further emotions can be listed by a user selecting, with mouse pointer 1050, the link "view more emotions."

Sub-pane 1012: Lists five of the focus sentences (1014-1018) found by the search (such as the search query of FIG. 10A). Viewing the focus sentences can help a user to better evaluate the precision of his or her search, by showing the search term within various contexts. For example, focus sentences 1014 and 1017 do appear to be statements of interest to a Brand Manager, while the other focus sentences appear to discuss other meanings of the word "tide." To make it easier to assess the relevance of each focus sentence shown, the search term can be shown with any appropriate graphical emphasis (e.g., any or all of underlining, boldfacing, color highlighting). For focus sentences 1014-1018, "Tide" is emphasized by boldfacing and underlining. Further focus sentences can be listed by a user selecting, with mouse pointer 1050, the link "view more focus sentences."

When a user selects a g_name, it can be useful to see its usage in context. In other words, in can be useful to see at least a sampling of the focus sentences in which the g_name appears. For FIG. 10B, for example, this could correspond to the user selecting g_name "Like" and then seeing, in pane 1012, a listing of focus sentences that express the emotion "like." From the perspective of IIDB queries, this operation can be accomplished as follows:

1. The search result (represented symbolically by "ROLE_VALUES_SEARCH_RESULT") can be searched for all role values that use the user-selected g_name. The result of this search can be referred to as the ordered list "g_name_list." Based on the CSH, and an example role value being sought of "Like," the IIDB query can be:

```
AND(
    ROLE_VALUES_SEARCH_RESULT,
    RoleObj.Value='Like')
)
```

2. The "To" operator is then applied to g_name_list, in order to translate its list of role-level role values to the higher level of focus sentences that contain such role values. Since the focus sentences are two levels higher than the role values, in the CSH, the IIDB query can be:

```
To(
    -2,
    AND(
        ROLE_VALUES_SEARCH_RESULT,
        RoleObj.Value='Like'))
)
```

When displaying such focus sentences to the user, it can be useful to highlight (or otherwise emphasize), within each such focus sentence, the occurrence of the g_name that caused the sentence to be displayed.

2.2 Exclude Term Assistant

While the above-described search process of Section 2.1 can often be very useful, it can have certain limitations. An example is the search of a SM_db for mentions of a C_Brand where the lexical unit or units, that represent the C_Brand, are ambiguous.

For the Section 2.1 example, of a Brand Manager of the C_Brand "Tide" searching a SM_db, an example query with an exclude term was already discussed. It is the following expression that excludes the word "government":

```
AND(
    NOT(SentenceObj.Snippet='Government'),
    SentenceObj.FocusSentence='Tide')
)
```

The present invention provides techniques for greatly improving the process by which Exclude Terms are identified. A step-by-step presentation of a process, that illustrates these techniques, follows.

2.2.1 Search for Lexical Unit of Interest

The Exclude Term identification process begins with a search for the lexical unit or units, that can refer to the O_of_I in the C_of_I. For clarity of explanation, we shall refer to one lexical unit, as potentially referring to the O_of_I. We can refer to that one lexical as the lexical unit of interest (or LU_of_I). (It is clear to anyone of ordinary skill in the art, that the following procedure can be expanded to accommodate more than one LU_of_I.)

The LU_of_I is assumed to be ambiguous, and therefore have at least two meanings:

1. A meaning that refers to the O_of_I.
2. A meaning that refers to something distinctly different from the O_of_I.

We will continue with the above-described example of a Brand Manager, seeking to research a C_Brand in a SM_db. In particular, we will use the example of the LU_of_I being "Tide," and the single Exclude Term of "government" having been identified, as is shown in FIG. 10A.

By selecting the Exclude Term Assistant (ETA) button 1004, of FIG. 10A, the appropriate IIDB (such as the SM_db), can be searched for usage of the LU_of_I (e.g., "Tide"). However, unlike Section 2.1, rather than limiting a match, to the LU_of_I, to being in a focus sentence, a focus sentence will be included in a search result so long as the LU_of_I matches anywhere in the focus sentence's snippet. A broader search is done in the present section because we are specifically seeking Exclude Terms. Therefore, we are specifically interested in finding contexts, other than the desired context of interest, where the same LU_of_I may be utilized. In a similar manner to that discussed in Section 2.1, the following query can return the list of all snippets that contain the LU_of_I:

SentenceObj.Snippet='Tide'

Any Exclude Terms, already identified, can be stored in stored in a list referred to herein as the "Exclude Term List" (or "ET_list"). When performing the search of the snippets, even if a snippet has the LU_of_I, if the snippet also includes a member of the ET_list, then the snippet is not included in the search result. For the case of "n" Exclude Terms, and the LU_of_I being "Tide," the following expression can be used to produce a list of snippets that is reduced by each member of the ET_list:

```
AND(
    SentenceObj.FocusSentence='Tide',
    NOT(SentenceObj.Snippet=ET_list_1),
    NOT(SentenceObj.Snippet=ET_list_2),
    . . .
    NOT(SentenceObj.Snippet=ET_list_n))
)
```

For clarity of explanation, the list of focus sentences resulting from this step can be referred to as "ETA_FOCUS_SENTENCES."

2.2.2 Focus Sentences to Role Values

For each focus sentence, from the set of focus sentences retrieved (i.e., ETA_FOCUS_SENTENCES), the "To" operator can be used twice (in a manner similar to that discussed above in Section 2.1, "Consumer Sentiment Search"):

1. To go from the set of focus sentences "To" the instances of the frames (such as the "Like" frame) found to have occurred in such sentence. For clarity of explanation, the list of instances resulting from this use of the "To" operator can be referred to as "ETA_INSTANCES."
2. For each instance found (such as an instance of the "Like" frame), to go from the instance "To" the role values of a particular role or roles of such instance. For clarity of explanation, the list of resulting from this use of the "To" operator can be referred to as "ETA_ROLES."

However, unlike Section 2.1, the two just-above listed uses of the "To" operator can differ, respectively, as follows:

1. First use of the "To" operator can be used to go to many more types of frame instances than just the particular frame the user may have an interest in (such as a Brand Manager user just being interested in the "Like" frame). Once again (as was discussed above in Section 2.2.1 "Search for Lexical Unit of Interest") this broader mapping is done because we are specifically seeking Exclude Terms.
2. Second use of "To" operator is typically used to focus on roles where the role value denotes a kind of "object." For example, for the above-discussed "Like" frame, this is the Object role. This focus, upon roles that denote an object, is done because the purpose of the Exclude Terms is to remove, from a search result, objects that are not the O_of_I.

2.2.3 Down-Sampling

Given the size of the IIDB's that can be processed, there may be too many resulting role values from the previous step (i.e., the role values indicated by ETA_ROLES), for processing by the next step of frequency and cluster analysis. For example, the step of Section 2.2.2 can produce 20-30 million role values.

A sampling can be performed, of only a portion of the result of ETA_ROLES, to produce a computationally tractable number of role values. Any of the known statistical techniques, for approximating the range of values of a larger population from a smaller sample of that population, can be used. For example, assume that ETA_ROLES represents an ordered list of $10^7$ role values and that only $10^5$ values can be processed, by the next step (Section 2.2.4), in a sufficiently small time period. This means that for each $10^2$ role values, of ETA_ROLES, only 1 is included in the set of role values passed-along by this step for further processing.

Regardless of whether down-sampling is preformed, for purposes of the next step (Section 2.2.4), it is assumed that ETA_ROLES indicates the ordered list of roles for processing.

2.2.4 Frequency and Cluster Analysis

Given the ordered list of role values produced by either of Section 2.2.2 or Section 2.2.3 (either of which is indicated by ETA_ROLES), the following four main steps can be performed. Collectively, the following four steps can be referred to herein as "Basic Frequency and Cluster Analysis" or "Basic FCA":

1. Each role value of ETA_ROLES can have each of its constituent lexical units put into a generic form (by such operations as "stemming") and "stop words" can be eliminated.
2. Frequencies of occurrence of unique sets of one or more lexical units, across role values of ETA_ROLES, is determined.
   a. To illustrate this step 2 (as well as the rest of Basic FCA) an example, referred to herein as "Example Frequency and Cluster Analysis" or "Example FCA," is presented. For Example FCA, we will consider only the following small subset of role values for ETA_ROLES: ("tide", "crimson tide", "crimson tide", "high tide", "crimson tide", "high tide")
   b. The unique sets of one or more lexical units are: ("tide"), ("crimson"), ("high"), ("tide", "crimson"), ("tide", "high").
   c. The unique sets, each with its frequency of occurrence among the example role values, are:
      i. Unique Set: ("tide") Frequency: 6
      ii. Unique Set: ("crimson") Frequency: 3
      iii. Unique Set: ("high") Frequency: 2
      iv. Unique Set: ("tide", "crimson") Frequency: 3
      v. Unique Set: ("tide", "high") Frequency: 2
3. The sets of lexical units can be subjected to grouping analysis, where similar sets of lexical units can all be put into a single group. The group can be given a group name based upon the overlap, of lexical units, between sets. The frequency of occurrence of a group name can be the frequency of occurrence of its corresponding set.
   a. Continuing with Example FCA, the following groups can be formed:
      i. Group: "tide" Frequency: 6
         1. Unique Set: ("tide") Frequency: 6
         2. Unique Set: ("tide", "crimson") Frequency: 3
         3. Unique Set: ("tide", "high") Frequency: 2
      ii. Group: "crimson" Frequency: 3
         1. Unique Set: ("crimson") Frequency: 3
         2. Unique Set: ("tide", "crimson") Frequency: 3
      iii. Group: "high" Frequency: 2
         1. Unique Set: ("high") Frequency: 2
         2. Unique Set: ("tide", "high") Frequency: 2
4. The group names and/or lexical unit sets can be listed in order of decreasing frequency. These group names and lexical unit sets represent candidate Exclude Terms and can be presented to a user for selection.
   a. Continuing with Example FCA, the following listing can be formed:
      i. Group: "tide" Frequency: 6
         1. Unique Set: ("tide", "crimson") Frequency: 3
         2. Unique Set: ("tide", "high") Frequency: 2
      ii. Group: "crimson" Frequency: 3
         1. Unique Set: ("tide", "crimson") Frequency: 3
      iii. Group: "high" Frequency: 2
         1. Unique Set: ("tide", "high") Frequency: 2
   b. As can be seen, the lexical unit set that just contains the word "tide" is both the most frequent (having 6 occurrences) and overlaps with the following two other lexical unit sets: ("tide", "crimson") and ("tide", "high"). Within these two other lexical unit sets, ("tide", "crimson") occurs more frequently than ("tide", "high") and therefore ("tide", "crimson") is listed first.

The above-described Basic FCA, along with the Example FCA, can be related, as follows, to FIG. 10C. FIG. 10C shows an example screen 1020, of the ETA, when a Brand Manager is seeking to find Exclude Terms to improve a search for the Consumer Brand "tide."

FIG. 10C is divided into the following three panes:
1. Candidate Exclude Terms Pane 1021: Depicts the results of subjecting ETA_ROLES to the above-described Basic FCA. Pane 1021 has three main columns:
   a. Check box column 1024: Provides a check box interface, by which a user can select a candidate Exclude Term as an actual Exclude Term.
   b. Candidate Exclude Terms column 1025: Lists, in order of decreasing frequency, the candidate Exclude Terms. As shown in column 1025, the list of candidates can be grouped. Specifically, "tide" is shown to be a group name for six narrower (and multi-word) candidate Exclude Terms. These six multi-word candidates are indicated as being grouped under "tide" by their indenting. However, any suitable graphical technique, for the indication of grouping, can be used.
   c. Frequency column 1026: Presents, for a corresponding candidate Exclude Term, an indication of its frequency of occurrence among the focus sentences found (i.e., ETA_FOCUS_SENTENCES). Column 1026 depicts the percentage of focus sentences, with respect to ETA_FOCUS_SENTENCES, in which the corresponding candidate Exclude Term occurs. While the percentage is presented numerically, any suitable graphical technique, for indicating a relative amount, can be used. Further, while a relative measure is shown, any other suitable measure of frequency can be used. For example, an absolute count, of the number of actual occurrences of a corresponding candidate Exclude Term, can be shown.
2. Summary Pane 1022: Presents summary information, regarding the status of the user's query. Pane 1022 shows (from top to bottom) the following three example items of summary information (but any suitable forms of summary information could be included):
  a. Total number of focus sentences found, before using Exclude Terms as found by the ETA.
  b. Number of focus sentences found, when using Exclude Terms as found by the ETA. Also indicates, by a relative measure (such as percentage), the extent to which the number of focus sentences found has been reduced.
  c. Number of candidate Exclude Terms specifically selected by user (such specific selection is discussed below in Section 2.2.5).
3. Focus Sentences Pane 1023: Depicts a selection of focus sentences from ETA_FOCUS_SENTENCES.

Column 1025 has certain similarities to the Example FCA. As is shown for the Example FCA, for the fourth step of Basic FCA, column 1025 also shows "tide" as a group name, with "crimson tide" and "high tide" being sub-members of that group. Also like the Example FCA, column 1025 shows "crimson tide" listed before "high tide" because of the greater frequency of "crimson tide." Specifically, frequency column 1026 shows "crimson tide" and "high tide" as having, respectively, relative frequency indicators of 8% and 6%.

Although not specifically shown in column 1025, as illustrated in FIG. 10C, it can be assumed that the "crimson" group name, if opened, would show "crimson tide" as a sub-member (and this sub-member is found in the Example FCA at the fourth step of Basic FCA).

The term "high" as a group name, as found in the Example FCA at the fourth step of Basic FCA, is not illustrated in FIG. 10C.

Frequency and cluster analysis has been described as being performed on the values of the roles, that correspond to the focus sentences found by search of Section 2.2.1. However, frequency and cluster analysis could be performed directly upon the focus sentences found by search of Section 2.2.1. In this case, candidate Exclude Terms can be found by determining the various n-grams, to a suitable level of "n," on the focus sentences.

2.2.5 User Selection of Exclude Terms

As has already been introduced as a topic above, in Section 2.2.4, the user can select one or more items, from the list of candidate Exclude Terms. Such selection can be based upon any combination of the following factors (including other factors not specified herein)
1. Position of a candidate in the list, such position indicative of its frequency and/or importance, in relation to other candidate Exclude Terms.
2. Statistical information, listed with one or more of the candidate Exclude Terms. Such statistical information is typically informative of the frequency of the candidate with which it is listed. The statistical information can be listed in any suitable form or format, including numerical or graphical.
3. Compiled or summary information, regarding the list of remaining focus sentences, after application of the selected Exclude Terms. The list of remaining focus sentences is typically measured relative to the list (ETA_FOCUS_SENTENCES) produced by the search of Section 2.2.1. For example, as a result of selection of one or more candidates, it can be displayed that only 80% of the focus sentences remain.
4. Precision information, regarding the nature of the focus sentences associated with a candidate Exclude Term. For example, when a candidate Exclude Term is selected, a window can display a selection of the focus sentences in which it appears. A user can scroll through such window to better evaluate the extent to which such focus sentences are off-topic.

With specific reference to FIG. 10C, we see that the user has specifically selected the following four candidate Exclude Terms: "crimson tide," "high tide," "rise tide," and "alabama crimson tide." This selection is indicated by the check box in column 1024, for each of these candidate Exclude Terms, containing the symbol for a "check mark" (✓). These four selections also lead to a showing of the following:
  "4" Exclude Terms, in pane 1022, with "Num Exclude Terms."
  Only 80%, of the focus sentences ETA_FOCUS_SENTENCES, being left after using the Exclude Terms. As can be seen from column 1026, the percentages, of the four selected Exclude Terms, add up to 20%.
  The check box for group name "tide," in column 1025, containing a black square. A black square in a check box, as opposed to a "check mark" symbol, indicates that only some (but not all) of the candidate Exclude Terms, under a group name, have been selected. In the case of the group name "tide," only four of its six narrower candidate Exclude Terms are selected.
  The check boxes for group names "alabama" and "crimson," in column 1025, containing a black square. We can assume that each of "alabama" and "crimson" contain narrower candidate Exclude Terms, but that such narrower terms are not shown in FIG. 10C. We can assume that one (but not all) of the narrower terms under "alabama" is the specifically selected "alabama crimson tide." We can make a similar assumption for "crimson."

Precision information, regarding the nature of the focus sentences associated with a candidate Exclude Term, can be available in screen 1020 of FIG. 10C. Pane 1021 shows the user having placed his or her mouse pointer 1050 over the candidate Exclude Term "tide free." In response, a dashed outline around "tide free" is shown, indicating that this term is being considered but has not yet been selected. In response to being considered, focus sentences pane 1023 displays a selection of the focus sentences in which the candidate Exclude Term (in this example, "Tide Free") appears. To assist the user in observing the context for "Tide Free," the candidate Exclude Term can be graphically emphasized using any suitable technique (pane 1023 emphasizes each appearance of "Tide Free" with underlining). A user can scroll through such window, to obtain a better understanding of the extent to which such focus sentences are off-topic. In the case of "Tide Free," it can be seen that since such focus sentences are probably not off-topic, since they relate to a detergent. Therefore, it is probably the case that the user does not want to use "Tide Free" as an Exclude Term.

The user can loop back, to the beginning of the Exclude Term selection process, by returning to the search of Section 2.2.1. Upon such loop-back, the search will differ by inclusion the Exclude Terms selected. In FIG. 10C, this loop-back can be accomplished by the user can selecting "Update" button 1027.

Alternatively, if the user is satisfied with the quality of the query, he or she can escape the ETA by "closing" screen 1020 (user-interface for closing not shown) and returning to a screen such as screen 1000 of FIG. 10A. Once back to FIG. 10A, but with the necessary Exclude Terms present, the user can perform (for example) a Consumer Sentiment Search, such as described in Section 2.1.

3 Computing Environment

FIG. 9 depicts an example production-level computer system design in which the techniques described herein can be applied.

Cloud 930 represents data, such as online opinion data, available via the Internet. Computer 910 can execute a web crawling program, such as Heritrix, that finds appropriate web pages and collects them in an input database 900. An alternative, or additional, route for collecting input database 900 is to use user-supplied data 931. For example, such user-supplied data 931 can include the following: any non-volatile media (e.g., a hard drive, CD-ROM or DVD), record-oriented databases (relational or otherwise), an Intranet or a document repository. A computer 911 can be used to process (e.g., reformat) such user-supplied data 931 for input database 900.

Computer 912 can perform the indexing needed for formation of an appropriate frame-based database (FBDB). FBDB's are discussed in the Related Applications. The indexing phase scans the input database for sentences that refer to an organizing frame (such as the "Like" frame), produces a snippet around each such sentence and adds the snippet to the appropriate frame-based database. FIG. 9 depicts an example FBDB 901. For the example frame-based search systems described in Section 2, an FBDB based on the "Like" frame could be produced.

Databases 920 and 921 represent, respectively, stable "snapshots" of databases 900 and 901. Databases 920 and 921 can provide stable databases that are available for searching, about an O_of_I in a C_of_I, in response to queries entered by a user at computer 933. Such user queries can travel over the Internet (indicated by cloud 932) to a web interfacing computer 914 that can also run a firewall program. Computer 913 can receive the user query, collect snippet and frame instance data from the contents of the appropriate FBDB (e.g., FBDB 921), and transmit the results back to computer 933 for display to the user. The results from computer 913 can also be stored in a database 902 that is private to the individual user. When it is desired to see the snippets, on which a graphical representation is based, FBDB 921 is available. If it is further desired to see the full documents, on which snippets are based, input database 920 is also available to the user.

In accordance with what is ordinarily known by those in the art, computers 910, 911, 912, 913, 914 and 933 contain computing hardware, and programmable memories, of various types.

The information (such as data and/or instructions) stored on computer-readable media or programmable memories can be accessed through the use of computer-readable code devices embodied therein. A computer-readable code device can represent that portion of a device wherein a defined unit of information (such as a bit) is stored and/or read.

4 Related Applications

The description presented herein relies on many parts of the Related Applications. This section makes reference to particular portions of the '837 Application, which is a member of the group of the Related Applications.

In general, sections of the '837 Application can be referred to herein by the following convention. Where "X" is a section number, the section can be referred to as: Section X, '837. If the title of the section is to be included, where the title is "Title," it can be referred to as: Section X, '837 ("Title") or Section X, '837, "Title."

Section 4, '837 ("FBSE") describes a Frame-Based Search Engine (or FBSE). This FBSE is a more generic form of the kind of search described herein in Section 2.1 ("Consumer Sentiment Search").

Section 4.2, '837 discusses frames as a form of concept representation (Section 4.2.1) and the use of frame extraction rules to produce instances of frames (Section 4.2.2). A pseudo-code format for frame extraction rules is presented in Section 6.2, '837 ("Frame Extraction Rules").

Snippets are discussed in Section 6.4, '837.

The "Frame-Based Database" (FBDB), discussed herein in Section 3 ("Computing Environment"), is described in Section 4.3.2 ("Pre-Query Processing"), '837.

5 Glossary of Selected Terms ancestor: with respect to a node "y," used to refer to a node "x," at some higher level, that contains node "y."
C_Brand: "Consumer Brand"
C_of_I: "Corpus of Interest"
CSH: "Consumer Sentiment Hierarchy"
descendent: with respect to a node "y," used to refer to a node "z," at some lower level, that is contained by node "y." If "z" is the descendent of "y," then "y" is also the ancestor of "z" (see definition of ancestor).
ETA: Exclude Term Assistant
LU_of_I: lexical unit of interest
list: Used herein to refer to any collection of data items. Defined herein to refer to any suitable data structure, that provides functionally similar results.
O_of_I: "Object of Interest"
ordered collection: Preserves an ordering among data items and allows such data items to be referenced as a unit. Defined herein to refer to any suitable data structure, that provides functionally similar results.
ordered list: Preserves an ordering among data items and allows such data items to be referenced as a unit. Defined herein to refer to any suitable data structure, that provides functionally similar results.
precision: as a search query becomes more "precise," the likelihood increases, that any one search result is a desired search result.
pseudo-code (or pseudocode): as presented herein, is loosely based upon the syntax and semantics of the C Programming Language.
recall: as a search query achieves better "recall," the likelihood increases that all desired search results are included in the actual search result (although if precision is low, many undesired search results may also be included in the actual search result).
set: Used herein to refer to any collection of data items. Defined herein to refer to any suitable data structure, that provides functionally similar results.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for query formulation, comprising:
   accepting from a first user, through a first graphical user interface, a lexical unit of interest that can be indicative of an object-of-interest and can also be indicative of at least one object that is not the object-of-interest;

searching, performed at least in part with a configuration of computing hardware and programmable memory, a corpus, to produce a first collection of records, by testing for appearances of the lexical unit of interest;

identifying, performed at least in part with a configuration of computing hardware and programmable memory, within a first collection of frame instances corresponding to the first collection of records, a first collection of role values in the role of object;

performing, performed at least in part with a configuration of computing hardware and programmable memory, an analysis of each role value of the first collection of role values into sets of one or more lexical units that include the lexical unit of interest; and producing for display to the first user through a second graphical user interface, as a result of the analysis, a first candidate list of exclude terms, wherein at least one exclude term includes a lexical unit appearing in a set including the lexical unit of interest.

2. The method of claim 1, further comprising:
performing cluster analysis, of the sets of one or more lexical units, to produce a first candidate list of grouped exclude terms.

3. The method of claim 1, wherein the identifying is performed by use of an operator that identifies a cluster, for each record of the first collection of records, and maps an instance level to a role value level.

4. The method of claim 1, wherein the searching is performed by testing for appearances of the lexical unit of interest in snippets.

5. The method of claim 1, wherein each record, of the first collection of records, represents a focus sentence.

6. The method of claim 1, further comprising:
reducing a number of role values, contained in the first collection of role values, by obtaining a sample of the first collection of role values.

7. The method of claim 1, further comprising:
selecting one or more exclude terms, from the first candidate list of exclude terms.

8. The method of claim 7, further comprising:
searching a corpus, to produce a second collection of records, by testing for appearances of the lexical unit of interest and excluding any record that contains a member of the first candidate list of exclude terms.

9. The method of claim 8, wherein the searching, for both the first and second collection of records, is performed by testing for appearances of the lexical unit of interest in snippets.

10. The method of claim 1, further comprising:
performing frequency analysis, of the sets of one or more lexical units, to produce a first candidate list of grouped exclude terms.

11. The method of claim 1, wherein the step of identifying further comprises:
identifying a cluster, for each record of the first collection of records; and
mapping, for each cluster, from an instance level, representing the first collection of frame instances, to a role value level representing the first collection of role values.

12. The method of claim 11, further comprising:
determining, performed at least in part with a configuration of computing hardware and programmable memory, within an instance bit map, for each frame instance of the first collection of frame instances, a position of the frame instance within its cluster; and
mapping, performed at least in part with a configuration of computing hardware and programmable memory, with at least the instance bit map and a role-value bit map, from each frame-instance position to its corresponding positions, within a same cluster, in the role-value bit map.

13. The method of claim 11, further comprising:
determining, performed at least in part with a configuration of computing hardware and programmable memory, within a sentence bit map, for each sentence corresponding to a record of the first collection of records, a position of the sentence within its cluster; and
mapping, performed at least in part with a configuration of computing hardware and programmable memory, with at least the sentence bit map and an instance bit map, from each sentence position to its corresponding positions, within a same cluster, in the instance bit map.

14. The method of claim 1, further comprising:
producing a first Logical Form semantic representation for a first unit of natural language of a first record of the first collection of records;
determining whether a first frame extraction rule matches the first Logical Form;
producing, if the first frame extraction rule matches, a first instance having at least an object role, with a first undergoer value, of the first Logical Form, assigned to the object role of the first instance; and
including the first instance within the first collection of frame instances.

* * * * *